United States Patent
Kanai et al.

(10) Patent No.: US 8,240,204 B2
(45) Date of Patent: Aug. 14, 2012

(54) SYNCHRONOUS DETECTION CIRCUIT, SENSING CIRCUIT, PHYSICAL QUANTITY MEASURING DEVICE, GYRO SENSOR, AND ELECTRONIC APPARATUS

(75) Inventors: Masahiro Kanai, Suwa (JP); Asami Kobayashi, Fujimi-machi (JP); Naoki Yoshida, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 698 days.

(21) Appl. No.: 12/407,424

(22) Filed: Mar. 19, 2009

(65) Prior Publication Data

US 2010/0071466 A1    Mar. 25, 2010

(30) Foreign Application Priority Data

Mar. 21, 2008  (JP) ................. 2008-073129

(51) Int. Cl.
*G01P 9/00* (2006.01)
*G01C 19/00* (2006.01)
(52) U.S. Cl. ............... 73/504.12; 73/504.04; 73/497
(58) Field of Classification Search ............ 73/504.12, 73/504.02, 504.04, 1.37, 1.38, 497, 504.13, 73/504.14, 504.15, 504.16
See application file for complete search history.

(56) References Cited

U.S. PATENT DOCUMENTS

| | | | | |
|---|---|---|---|---|
| 5,677,486 A * | 10/1997 | Nakamura et al. | ......... | 73/504.14 |
| 5,806,364 A * | 9/1998 | Kato et al. | ................. | 73/504.12 |
| 5,922,954 A * | 7/1999 | Ebara et al. | ................ | 73/504.12 |
| 7,069,783 B2 * | 7/2006 | Uehara | ....... | 73/514.12 |
| 7,362,253 B2 * | 4/2008 | Ko | ............... | 341/144 |
| 7,370,531 B2 * | 5/2008 | Yokoi et al. | ............... | 73/504.12 |
| 7,434,466 B2 | 10/2008 | Ito | | |
| 7,446,691 B2 * | 11/2008 | Paul | .............. | 341/155 |
| 7,779,687 B2 * | 8/2010 | Murashima | ............... | 73/504.12 |
| 7,786,790 B2 * | 8/2010 | Yoshida et al. | ............. | 327/513 |
| 2009/0013785 A1 * | 1/2009 | Yoshida et al. | ............. | 73/514.16 |
| 2011/0121907 A1 * | 5/2011 | Kanai et al. | .................... | 331/65 |

FOREIGN PATENT DOCUMENTS

| | | |
|---|---|---|
| JP | A-2005-227234 | 8/2005 |
| JP | A-2006-170620 | 6/2006 |
| WO | WO 2005/068939 A1 | 7/2005 |

* cited by examiner

*Primary Examiner* — Helen C. Kwok
(74) *Attorney, Agent, or Firm* — Oliff & Berridge, PLC

(57) ABSTRACT

A synchronous detection circuit includes: an offset compensation circuit which generates an offset compensation voltage to compensate an offset voltage superposed on a direct current voltage signal; and a temperature compensation circuit which generates a temperature compensation voltage to compensate variation of a direct current reference voltage that depends on a temperature in a signal path of a sensing circuit. In the circuit, the synchronous detection circuit synchronously detects an alternating current signal, the offset compensation voltage and the temperature compensation voltage are respectively superposed on the alternating current signal which is input into the synchronous detection circuit, and the synchronous detection circuit synchronously detects the alternating current signal on which the offset compensation voltage and the temperature compensation voltage have been superposed.

15 Claims, 11 Drawing Sheets

SYNCHRONOUS DETECTION CIRCUIT, SENSING CIRCUIT, PHYSICAL QUANTITY MEASURING DEVICE, GYRO SENSOR, AND ELECTRONIC APPARATUS

This application claims priority to Japanese Patent Application No. 2008-073129 filed in Japan on Mar. 21, 2008, the entire disclosure of which is hereby incorporated by reference in its entirety.

BACKGROUND

1. Technical Field

The present invention relates to a synchronous detection circuit, a sensing circuit, a physical quantity measuring device, a gyro sensor, an electronic apparatus, and the like.

2. Related Art

WO2005-068939 is an example of related art. It discloses a sensing circuit that amplifies a charge (a physical quantity signal) from a sensor, removes an unnecessary signal (a signal whose phase is shifted 90 degrees with respect to a regular physical quantity signal) by synchronous detection, smoothes the signal after the synchronous detection with a smoothing circuit (a low pass filter) to convert it to a direct current voltage, and amplifies the direct current voltage signal, for example.

In a no-input state, a level of a sensed output (a direct current voltage) of the sensing circuit should match with the direct current reference voltage (a direct current bias voltage) in a signal path. However, the level of the sensed output is actually different from the direct current reference voltage. A voltage difference between the actual sensed output and the direct current reference voltage is called an offset voltage. That is, the actual sensed output is a voltage that the direct current reference voltage is superposed on the offset voltage. Various reasons cause the offset voltage. For example, an unnecessary leakage signal, or a leakage current of a transistor in the non-put state causes the offset voltage.

The offset voltage results in sensing a signal by the sensing circuit even there is no signal from the sensor, thereby a measurement error occurs. Especially, when an input signal (the charge) is minute and a frequency is low (e.g., approximately several hundred Hz), reducing the offset voltage becomes necessary to improve sensing accuracy.

Conventionally, to cancel the offset voltage, a method is employed in which an offset cancel voltage (a voltage that has the same potential difference with respect to a direct current reference voltage as the offset voltage and its polarity is different) is superposed on (added to) a signal path of a sensing circuit.

In the technique disclosed in the example of related art, a method is employed in which an offset cancel voltage is superposed on an input signal (a detection signal to be synchronized) of the synchronous detection circuit so as to synchronously detect the detection signal to be synchronized on which the offset cancel voltage is superposed.

In the technique disclosed in the example of related art, compensating variation of the direct current reference voltage which depends on the ambient temperature in a signal path is not considered. If the direct current reference voltage in the signal path varies in accordance with the ambient temperature, a level of a direct current voltage after the synchronous detection varies, and a sensing error occurs. Therefore, compensating the ambient temperature dependency of the direct current reference voltage of the signal path enables sensing accuracy to be improved.

In order to cancel temperature dependency of the direct current reference voltage, a temperature compensation voltage having an opposite characteristic from a temperature offset of the direct current reference voltage is superposed on a signal (an alternating current signal) of a detection object. However, it is necessary to choose a position on which the temperature compensation voltage to be superposed by taking a 1/f noise and the like into consideration so that the noise is most reduced.

Further, the offset compensation voltage and the temperature compensation voltage are independent from each other (uncorrelated parameter). Therefore, it is necessary to generate the above two voltages that are uncorrelated and independent from each other, and the voltages are independently superposed (added) without a correlation.

SUMMARY

The invention is based on such considerations. According to aspects of the invention, compensation of an offset voltage superposed on an output signal of a sensing circuit and compensation of variation of a direct current reference voltage which depends on a temperature in a signal path are both realized, a noise of the compensation can be minimized, and sensing accuracy of the sensing circuit can be further improved.

According to a first aspect of the invention, a synchronous detection circuit includes: an offset compensation circuit which generates an offset compensation voltage to compensate an offset voltage superposed on a direct current voltage signal; and a temperature compensation circuit which generates a temperature compensation voltage to compensate variation of a direct current reference voltage that depends on a temperature in a signal path of a sensing circuit. In the circuit, the synchronous detection circuit synchronously detects an alternating current signal, the offset compensation voltage and the temperature compensation voltage are respectively superposed on the alternating current signal which is input into the synchronous detection circuit, and the synchronous detection circuit synchronously detects the alternating current signal on which the offset compensation voltage and the temperature compensation voltage have been superposed.

In the aspect, the offset compensation voltage and the temperature compensation voltage are respectively superposed on the alternating current signal input into the synchronous detection circuit. In a sensing circuit, since signal amplitude is reduced by converting an alternating current signal into a direct current signal, the direct current signal is generally amplified by an amplifier having a high gain and is output. Therefore, for example, if the temperature compensation voltage is superposed on a signal after synchronous detection, an S/N ratio is degraded due to a 1/f noise of the amplifier having a high gain. Accordingly, when the alternating current signal is converted into the direct current signal (i.e., when synchronously detected), the offset compensation voltage and the temperature compensation voltage are respectively superposed. Consequently, the 1/f noise can be most reduced. In addition, not only offset compensation but temperature compensation is performed, so that sensing accuracy of the sensing circuit is further improved. The synchronous detection circuit may be called a mixer in a communication field. That is, the synchronous detection circuit can be considered as a mixer because the circuit has a function of converting alternating current into direct current (performs frequency conversion).

The synchronous detection circuit further may include an inverting amplifier. The offset compensation voltage may be superposed on the direct current reference voltage of a first input node of the inverting amplifier that inverts a voltage level of the alternating current signal, the temperature compensation voltage may be superposed on the direct current reference voltage of a second input node of the inverting amplifier, and the direct current reference voltage of the second input node of the inverting amplifier may be electrically isolated from the direct current reference voltage of the first input node.

The offset compensation voltage and the temperature compensation voltage are independent from each other (uncorrelated parameter). Therefore, it is necessary to generate the above two voltages that are uncorrelated and independent from each other, and the voltages are independently superposed (added) without a correlation.

Here, the direct current reference voltage (a direct current bias voltage or an analog reference voltage) in the signal path in the sensing circuit is denoted as "AGND," the offset voltage superposed on an output signal (a direct current voltage) of the sensing circuit is denoted as "Voff," the offset compensation voltage is denoted as "Voffm," and the temperature compensation voltage is denoted as "VTS," for example. When a high level power supply voltage is denoted as VDD, AGND is VDD/2, for example.

Voffm=−Voff is satisfied. That is, a potential difference between the offset compensation voltage Voffm and the direct current reference voltage AGND is the same as that between the offset voltage Voff and the direct current reference voltage AGND. Further, a polarity with respect to the direct current reference voltage AGND of the offset compensation voltage Voffm is opposite from a polarity with respect to the direct current reference voltage AGND of the offset voltage Voff.

The offset voltage Voff is expressed as a potential difference (a voltage difference) with respect to the voltage AGND. When a voltage from a source of the offset voltage varies in accordance with the ambient temperature, the voltage AGND also varies in the same manner. Therefore, the potential difference between both voltages can be regarded as unchanged. That is, the offset voltage Voff is a specific voltage for each sensing circuit (IC), and does not depend on the temperature. Therefore, the offset compensation voltage Voffm does not depend on the temperature and is constant.

On the other hand, the temperature compensation voltage VTS is used for compensating variation caused by the temperature of the direct current reference voltage AGND itself, and the voltage value varies in accordance with the ambient temperature. Therefore, the voltage Voffm and the voltage VTS need to be independently added at the same place. The voltage Voffm is a direct current voltage and does not depend on the temperature. The voltage VTS depends on the temperature.

Therefore, in the aspect, by a used of an inverting amplifier (e.g., a differential amplifier) included in the synchronous detection circuit, "Voffm" and "VTS" are added in parallel to the alternating current signal input to the synchronous detection circuit. In this case, an output voltage of the inverting amplifier (the differential amplifier) respectively reflects "Voffm" and "VTS." That is, each voltage can be added simultaneously.

The offset compensation voltage Voffm is input into an inverting input terminal (a first input node) of the inverting amplifier (the differential amplifier), and the temperature compensation voltage VTS is input into a non-inverting input terminal (a second input node) of the inverting amplifier (the differential amplifier), for example. At this time, the direct current reference voltage AGND at the non-inverting input terminal of the inverting amplifier (a terminal to which the temperature compensation voltage VTS is applied) is electrically isolated from the direct current reference voltage AGND at the inverting input terminal of the inverting amplifier (a terminal to which the offset compensation voltage Voffm is applied). This is due to maintain independence of the voltages respectively applied to the two input terminals (the first and the second input nodes) of the inverting amplifier.

That is, a voltage of the inverting input terminal is expressed as VAoff=AGND+Voffm, and a voltage of the non-inverting input terminal is expressed as Vtemp=AGND+VTS. The voltages VAoff and Vtemp of respective terminals must be electrically independent.

Thus, a layout structure is employed that the direct current reference voltage AGND at the non-inverting input terminal of the inverting amplifier (a terminal into which the temperature compensation voltage VTS is input) can be electrically isolated from the direct current reference voltage (AGND) at the inverting input terminal of the inverting amplifier (a terminal into which the offset compensation voltage Voffm is input). Accordingly, the direct current reference voltage AGND for the two input terminals (the first and the second input nodes) of the inverting amplifier are electrically isolated from each other. Therefore, the temperature compensation voltage VTS and the offset compensation voltage Voffm can be independently applied to the two input terminals (the first and the second input nodes) of the inverting amplifier.

In the synchronous detection circuit, an impedance of the offset compensation circuit viewed from the first input node of the inverting amplifier may be constant regardless of an operating state of the offset compensation circuit.

The offset compensation voltage Voffm and the temperature compensation voltage VTS must be added independently. Therefore, the two compensation voltages need to be respectively superposed on the signal path by using the principle of superposition. The principle of superposition is such that, in a linear electric circuit having a plurality of voltage sources, a voltage at any point equals to a sum of voltages of the plurality of the voltage sources when they exist singly. In order to apply the principle of superposition, a linearity of the signal path needs to be ensured. Here, expressions and examples used for the above aspect will be used for a specific description.

For example, when the temperature compensation voltage VTS is applied to the non-inverting input terminal (the second input node) of the inverting amplifier, it must be ensured that a level of the output signal of the inverting amplifier varies linearly by only depending on the temperature compensation voltage VTS (otherwise, a voltage component varies in according with the temperature of the voltage AGND can not be canceled). Therefore, the impedance of the offset compensation circuit when viewed from a common connection node (referred to as a node X) of the inverting input terminal (the first input node) of the inverting amplifier and the offset compensation circuit needs to be always constant. That is, the impedance of the offset compensation circuit in regard to the inverting input terminal (the first input node) of the inverting amplifier is preferably constant regardless of an operating state of the offset compensation circuit.

If the impedance of the offset compensation circuit varies in accordance with a state of the offset compensation circuit, an amount of the current flowing between the node X and the offset compensation circuit varies in accordance with a state of the offset compensation circuit. Accordingly, the voltage of the node X varies, and correspondingly, the output of the inverting amplifier also varies. In this case, the output of the inverting amplifier does not follow "varying linearly only depending on the voltage level of the temperature compensation voltage VTS applied to the non-inverting input terminal of the inverting amplifier," so that the linearity of the signal path is not ensured.

Therefore, in the aspect, there is a condition that "the impedance of the offset compensation circuit when viewed from the first input node of the inverting amplifier (i.e., in regard to the first input node) is constant regardless of an operating state of the offset compensation circuit." Accordingly, the offset compensation voltage and the temperature compensation voltage can be added independently by the principle of superposition.

In the synchronous detection circuit, the offset compensation circuit may be a D/A converter of an R2R ladder type, and an impedance of the R2R ladder viewed from the first node of the inverting amplifier may be constant.

A specific structural example of the offset compensation circuit is described in order to have "a constant impedance of the offset compensation circuit when viewed from the first node of the inverting amplifier regardless of an operating state of the offset compensating circuit." In the aspect, the D/A converter of the R2R ladder type is used.

In the synchronous detection circuit, the offset compensation circuit may include an operational amplifier that outputs the offset compensation voltage, and an output impedance of the operational amplifier may be constant so that an impedance of the offset compensation circuit viewed from the first node of the inverting amplifier may be constant.

Another specific structural example of the offset compensation circuit is described in order to have "a constant impedance of the offset compensation circuit when viewed from the first node of the inverting amplifier regardless of an operating state of the offset compensating circuit" In the aspect, by a use of the constant (an extremely low) output impedance of the operational amplifier, the offset compensation voltage is generated. For example, to the operational amplifier, a voltage difference between a high level power supply voltage VDD and the direct current reference voltage AGND is amplified. AGND is VDD/2, for example. The voltages VDD and AGND similarly vary with respect to the temperature. Accordingly, the voltage difference (=VDD−AGND) between these voltages does not vary in accordance with the temperature. Therefore, if a gain of the operational amplifier is appropriately adjusted, a voltage in which the direct current reference voltage AGND is superposed on the offset compensation voltage Voffm can be generated. As described above, the output impedance of the operational amplifier is extremely small so as to be constant.

According to a second aspect of the invention, a sensing circuit includes: the synchronous detection circuit described as above; and a smoothing circuit which smoothes an output signal of the synchronous detection circuit.

In the synchronous detection circuit, since temperature compensation and offset compensation are achieved, a sensing circuit with high sensing accuracy (e.g., an IC having a signal sensing function that includes a synchronous detection circuit (a detection circuit in a broad sense), a smoothing circuit, and the like) is realized.

The sensing circuit further may include a memory circuit that stores adjustment data for controlling an operation of the offset compensation circuit.

In the sensing circuit, the memory circuit (e.g., a nonvolatile memory such as an EPROM) that stores adjustment data for offset canceling is provided. Thus, by a use of a look-up table method, a canceling process of the offset voltage can be automated, for example. That is, when shipping the IC (an integrated circuit) including the sensing circuit, a direct current offset voltage of an output signal of the IC is measured and input an adjustment signal into the IC (the integrated circuit) for canceling the offset voltage by workers of IC manufacturers. The memory circuit is accessed by the adjustment signal, and adjustment data is output from an adjustment table included in the memory circuit. A voltage value of an offset compensation voltage output from the offset compensation circuit is automatically determined by the adjustment data. Therefore, automation of the offset cancel process reduces a burden of workers.

According to a third aspect of the invention, a physical quantity measuring device includes the sensing circuit described as above. In the device, a physical quantity signal to be measured is input into.

Therefore, the physical quantity measuring device that is capable of measuring physical quantity with substantially high accuracy based on a minute physical quantity signal is realized.

The physical quantity measuring device further may include a vibrator serving as a sensor and an oscillation driving circuit which forms an oscillation loop with the vibrator to excite a drive vibration for the vibrator. In the device, the physical quantity signal may be output from the vibrator, and the oscillation driving circuit may generate a reference signal for synchronous detection in the sensing circuit based on a signal in the oscillation loop and provide the sensing circuit with the reference signal.

The sensing circuit included in the physical quantity measuring device senses physical quantity (an angular velocity, acceleration, and the like) based on a signal output from the vibrator serving as a sensor (a physical quantity transducer). The vibrator is vibrated by the oscillation driving circuit included in the physical quantity measuring device. The oscillation driving circuit generates a synchronous detection reference signal and supplies the sensing circuit with the synchronous detection reference signal. The physical quantity measuring device can be composed of, for example, a single IC. According to the aspect, a physical quantity measuring device that is capable of sensing a physical quantity with high accuracy (high sensitivity) based on a signal output from the vibrator is realized.

According to a fourth aspect of the invention, a gyro sensor includes the physical quantity measuring device described as above, and the vibrator that outputs the physical quantity signal.

According to the aspect, the gyro sensor that is capable of sensing a physical quantity with high accuracy (high sensitivity) based on a signal output from the vibrator is realized.

According to a fifth aspect of the invention, an electronic apparatus includes the physical quantity measuring device described as above.

With the electronic apparatus, based on a measuring result by the physical quantity measuring device, an operation of the electronic apparatus can be controlled, or the measuring result can be displayed on a display screen of the electronic apparatus. Since the physical quantity measurement is realized with high accuracy, a performance of the electronic apparatus is also improved.

According to a sixth aspect of the invention, the electronic apparatus includes the gyro sensor described as above.

In the electronic apparatus, based on a sensor output by the gyro sensor, an operation of the electronic apparatus can be controlled, or the measuring result can be displayed on a display screen of the electronic apparatus. Since the sensor output with high accuracy is realized, performance of the electronic apparatus is also improved.

According to the invention, compensation of an offset voltage superposed on an output signal of a synchronous detection circuit (and a sensing circuit including a synchronous detection circuit) and compensation of variation which depends on a temperature of a direct current reference voltage in a signal path are both realized. A noise of the compensation can be minimized, and sensing accuracy of the sensing circuit can be further improved.

BRIEF DESCRIPTION OF THE DRAWINGS

The invention will be described with reference to the accompanying drawings, wherein like numbers reference like elements.

DETAILED DESCRIPTION OF EMBODIMENTS

The embodiments of the invention will now be described with reference to the accompanying drawings. The embodiments explained below do not unduly limit the contents of the present invention described in the claims and all of the configurations explained in the embodiments are not indispensable to the means to solve the problem of the invention.

First Embodiment

In the embodiment, a structure and an operation of a sensing circuit including a synchronous detection circuit will be described.

Figure 1:
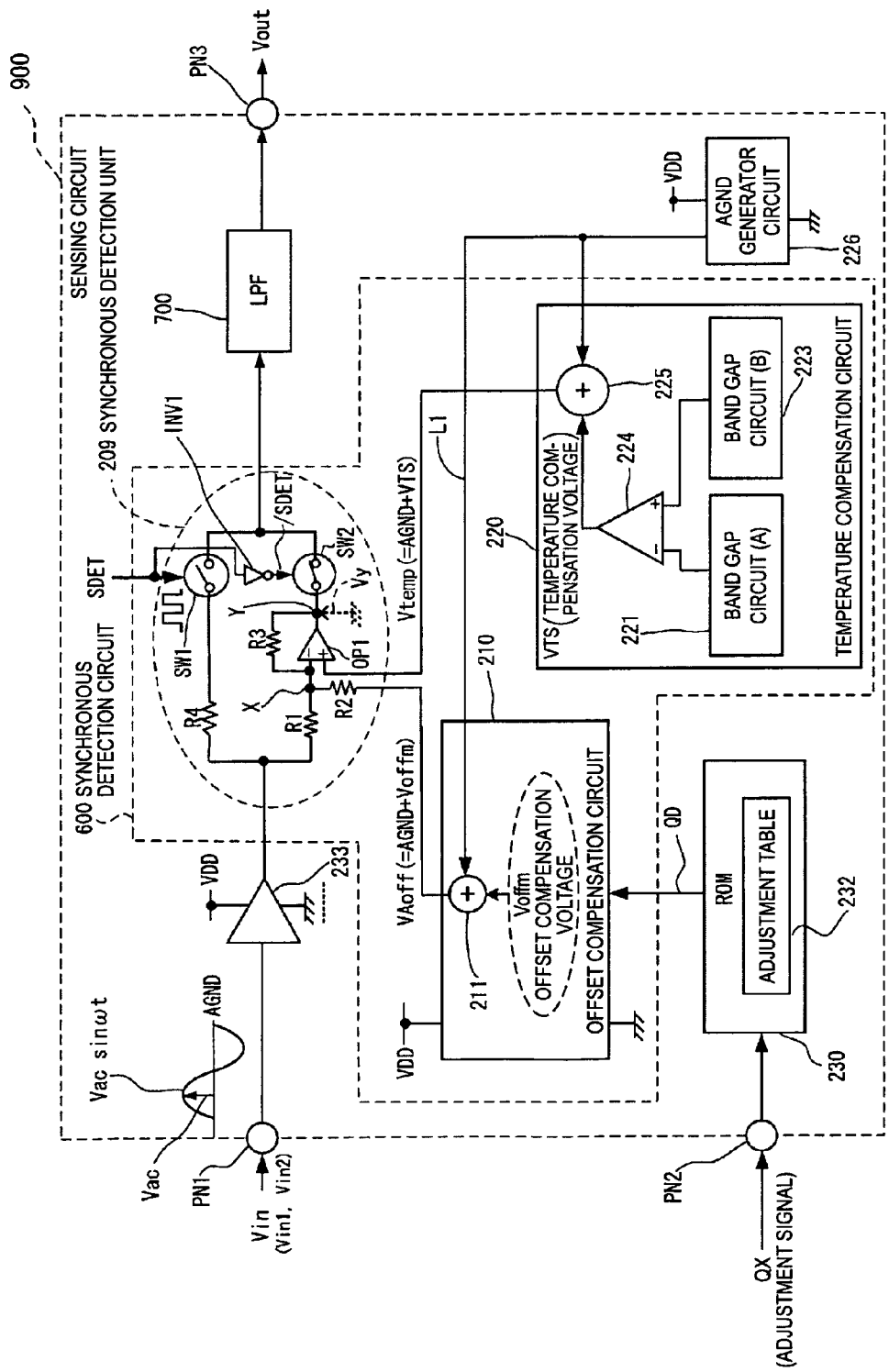
FIG. 1 is a circuit diagram showing a structure of a synchronous detection circuit (and a sensing circuit including a synchronous detection circuit)

Rough Structure and Operation of Sensing Circuit Including Synchronous Detection Circuit FIG. 1 is a circuit diagram showing a structure of a sensing circuit including a synchronous detection circuit. A sensing circuit 900 includes a synchronous detection circuit 600, a first stage amplifier 233, a low pass filter (LPF) 700, a ROM 230 including an adjustment table 232, an AGND generator circuit (an AGND source) 226 generating an analog reference voltage (a direct current bias voltage) AGND, a first terminal PN1 into which an input signal Vin is input, a second terminal PN2 into which an adjustment signal QX is input, and a third terminal PN3 outputting a sensed output Vout.

The synchronous detection circuit 600 includes a synchronous detection unit 209, an offset compensation circuit 210, and a temperature compensation circuit 220.

The first stage amplifier 233 is a Q/V converter circuit which converts a charge (Q) of the input signal Vin from a vibrator (not shown in FIG. 1) into a voltage (V), for example. The sensing circuit 900 operates between a high level power supply voltage VDD and a low level power supply voltage GND (a ground potential), for example. The input signal Vin is a sine wave (or a cosine wave) which vibrates with respect to the analog reference voltage (the direct current bias voltage) AGND, and is synchronized with a reference signal SDET.

The input signal Vin includes an input signal Vin1 and an input signal Vin2. The Vin1 is in phase with the reference signal SDET. The Vin2 has a component whose phase is shifted 90 degrees with respect to the reference signal SDET (a quadrature component). The input signals Vin1 and Vin2 are synchronously detected by the synchronous detection circuit 600. The synchronous detection circuit 600 synchronously detects the input signals Vin1 and Vin2 with the reference signal SDET. The synchronously detected signal is converted into a direct current with the low pass filter (LPF) 700 which serves as a smoothing circuit. Consequently, a detection output Vout is obtained.

The synchronous detection unit 209 of the synchronous detection circuit 600 includes a first signal path (hereafter, referred to as a non-inverting path) and a second signal path (hereafter, referred to as an inverting path). The first signal path transmits the input signal without inverting a level of the input signal. The second signal path transmits an input signal after inverting a level of the input signal with an inverting amplifier. The non-inverting path includes a resistance R4 and a first switch SW1. The inverting path includes the inverting amplifier and a second switch SW2. The inverting amplifier includes an input resistance R1, an operational amplifier OP1, and a feedback resistance R3.

The first switch SW1 and the second switch SW2 are composed of an NMOS transistor, for example. The first switch SW1 is turned on/off by the reference signal SDET. The second switch SW2 is turned on/off by a signal SDET which is level-inverted the reference signal SDET with an inverter INV1.

The offset compensation circuit 210 generates an offset compensation voltage Voffm for canceling an offset voltage Voff which is superposed on the sensed output Vout. The offset compensation voltage Voffm is added to the analog reference voltage AGND by an adding circuit 211. The analog reference voltage AGND is generated by the AGND generator circuit 226. The AGND generator circuit 226 has a circuit structure which generates VDD/2 by dividing a high level power supply voltage VDD by two voltage dividing resistances having the same resistance value, for example. Thus, VAoff(=Voffm+AGND) is generated. The voltage VAoff is applied to a node X in the synchronous detection circuit 600 through a resistance R2. That is, the voltage VAoff is applied to an inverting input terminal (a first input node) of an inverting amplifier OP1 which is provided to the inverting path of the synchronous detection circuit 600. A specific structural example of the offset compensation circuit 210 will be described with reference to FIGS. 4 to 6.

Here, Voffm=−Voff is satisfied. A potential difference between the offset compensation voltage Voffm and the analog reference voltage AGND is the same as that between the offset voltage Voff and the analog reference voltage AGND. A polarity with respect to the analog reference voltage AGND of the offset compensation voltage Voffm is opposite from a polarity with respect to the analog reference voltage AGND of the offset voltage Voff. In the following description, when the "polarity" is referred, a reference voltage is the voltage AGND. In a case shown FIG. 1, the voltage Voffm which is output from the offset compensation circuit 210 is applied to the inverting input terminal of the operational amplifier OP1. For example, when the offset voltage Voff has a positive polarity (Voff>0), the offset compensation voltage Voffm output from the offset compensation circuit 210 also has a positive polarity (Voffm>0). However, since the voltage Voffm is applied to the inverting input terminal of the operational amplifier OP1, −Voffm which has an opposite polarity from the offset voltage (+Voff) is applied to a signal transmission path.

That is, the application of VAoff(=Voffm+AGND) lowers (or raises) a level of the signal (a direct current voltage) after the synchronous detection. If the voltage value according to this variation is matched with the voltage value of the offset voltage Voff which is superposed on the detection output, the offset voltage Voff superposing with the detection output Vout can be removed.

The voltage value of the offset compensation voltage Voffm can be adjusted by the adjustment signal QX input from the second terminal PN2. That is, when the adjustment signal QX is input from the second terminal PN2, the adjustment table 232 included to the ROM (e.g., an EEPROM) 230 is accessed by the adjustment signal QX. As a result, correction data QD is output from the adjustment table 232. The voltage value of the offset compensation voltage Voffm is adjusted by the correction data QD. By a use of a look-up table method, the correction data QD can be efficiently and automatically generated.

The temperature compensation circuit 220 includes, for example, a band gap circuit (A) 221, a band gap circuit (B) 223, a differential amplifier 224, and the AGND generator circuit 226. From the differential amplifier 224, a temperature compensation voltage VTS is generated. The temperature compensation voltage VTS is added to the voltage AGND by the adding circuit 225. The voltage AGND is generated by the AGND generator circuit 226. Thus, Vtemp (=VTS+AGND), a temperature compensated analog reference voltage, is generated. In the following description, the voltage Vtemp may be referred to as a temperature compensated voltage and also be simply described as Vtemp. The voltage Vtemp is applied to a non-inverting input terminal (a second input node) of the operational amplifier OP1 which is provided on the inverting path of the synchronous detection circuit 600.

A high gain amplifier is not provided to the synchronous detection circuit 600. Accordingly, when an alternating current signal is converted to a direct current signal (i.e., when synchronously detected), the offset compensation voltage Voffm and the temperature compensation voltage VTS are added to the same place so as to minimize the influence of a noise 1/f of the circuit. Therefore, an S/N ratio of the sensing circuit can be improved.

Operation of Synchronous Detection Circuit

Figure 2:
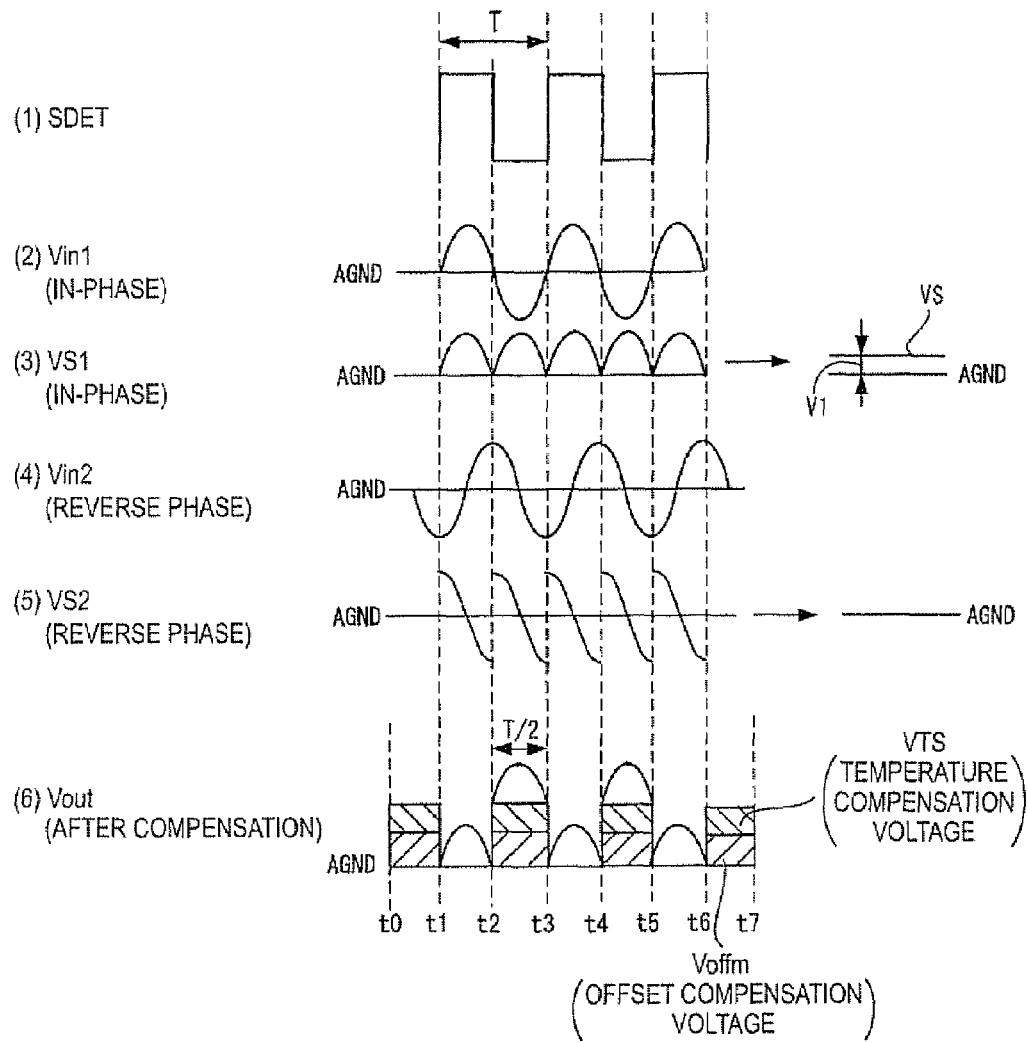
FIG. 2 is a diagram for explaining an operation of a synchronous detection circuit.

FIG. 2 is a diagram for explaining an operation of a synchronous detection circuit. A common operation of the synchronous detection unit 209 in the synchronous detection circuit 600 will now be described.

As described above, the input signal Vin includes the signal Vin1 and the signal Vin2. The signal Vin1 is a component in phase with the reference signal SDET. The Vin2 is a component whose phase is shifted 90 degrees with respect to the reference signal SDET (the quadrature component). The synchronous detection circuit 600 includes the synchronous detection unit 209. The synchronous detection unit 209 synchronously detects the signals Vin1 and Vin2 by using the reference signal SDET. As a result, detection signals VS1 and VS2 are obtained. The detection signals VS1 and VS2 are converted into direct current with the low pass filter (LPF) 700 which serves as the smoothing circuit.

As shown in (1) of FIG. 2, the reference signal SDET is a square wave with a period T. As shown in (2) of FIG. 2, the signal Vin1, an in-phase component, is a sine wave (or a cosine wave) which vibrates with respect to the analog reference voltage AGND (the direct current bias voltage), and is synchronized with the reference signal SDET.

If the signal Vin1, i.e., the in-phase component, is synchronously detected, as shown in (3) of FIG. 2, a signal with a wave shape formed by fully rectifying the signal Vin1 is obtained. The signal is smoothed by the low pass filter (LPF) 700, as shown in the right of (3) of FIG. 2, a detection output VS is obtained, for example. The detection output VS is a direct current signal having a potential difference of +1 with respect to the voltage AGND, for example.

On the other hand, a detection output VS2 obtained by synchronously detecting the signal Vin2 that is the quadrature component having a wave shape as shown in (5) of FIG. 2. In the wave shape, an area of the positive polarity is the same as that of the negative polarity with respect to AGND as a reference level. When the detection output VS2 is smoothed by the low pass filter (LPF) 700, the area of the positive polarity and the area of the negative polarity are cancelled out each other. Therefore, as shown in the right side of (5) of FIG. 2, the level of the detection output becomes AGND (i.e., no signal). As a result, the signal Vin1 which is the in-phase component and is synchronized with the reference signal SDET can be selectively detected.

In the above description, the offset compensation voltage Voffm and the temperature compensation voltage VTS are not considered.

As described above, in the synchronous detection unit 209 of the synchronous detection circuit 600 shown in FIG. 1, the offset compensation and the temperature compensation are performed. A synchronous detection output Vout (after the compensation) of after offset compensation and temperature compensation is shown in (6) of FIG. 2. As shown in the figure, the offset compensation voltage Voffm and the temperature compensation voltage VTS are independently added to the signal Vin without influencing each other. The offset compensation voltage Voffm and the temperature compensation voltage VTS are added to the signal Vin at a half period T/2, i.e., periods from time t0 to time t1, time t2 to time t3, time t4 to time t5, and time t6 to time t7. Accordingly, high accurate offset compensation and high accurate temperature compensation can be both realized.

Figure 3:
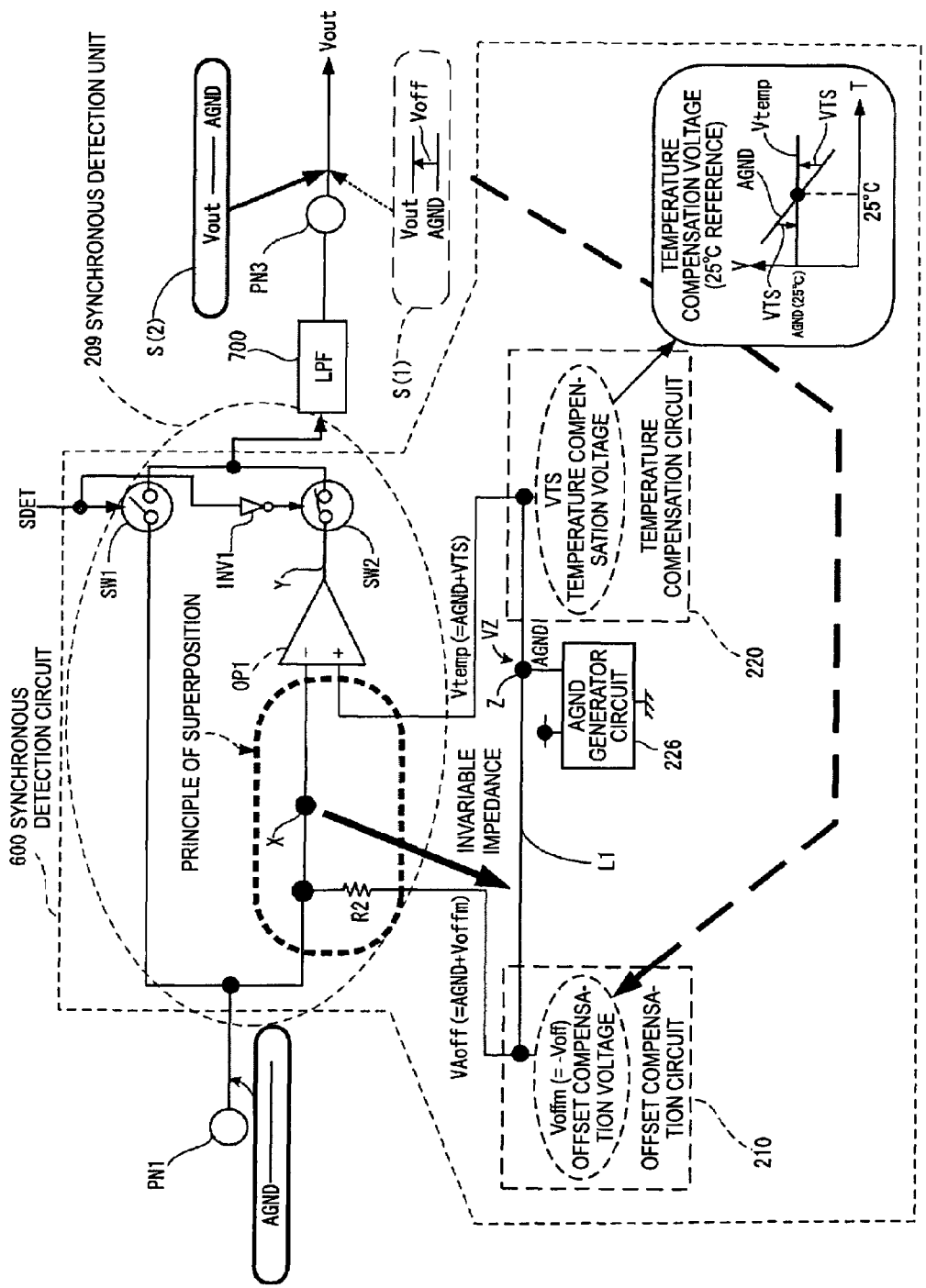
FIG. 3 is a diagram for explaining a relationship between an offset compensation voltage and a temperature compensation voltage, and an addition method of these voltages.

Relationship of Offset Compensation Voltage Voffm and Temperature Compensation Voltage VTS, and Addition Method of these Voltages FIG. 3 is a diagram for explaining a relationship between the offset compensation voltage Voffm and the temperature compensation voltage VTS, and an addition method of these voltages. In FIG. 3, a state that the input signal Vin is not applied to the first terminal PN1 is assumed. In this case, a voltage level of the detection output Vout which is output from the third terminal PN3 ideally matches with that of the analog reference voltage AGND in the absence of the offset voltage Voff (refer to a state S(2) shown in the right side of FIG. 3). However, the offset voltage Voff is actually superposed on the detection output Vout (refer to a state S(1) shown in the right side of FIG. 3). In order to remove the offset voltage Voff, the offset compensation voltage Voffm is superposed on the inverting input terminal (the first input node) of the operational amplifier OP1. Thus, the offset voltage Voff is removed.

In addition, the voltage level of the analog reference voltage AGND varies in accordance with the environmental temperature, for example, as shown in lower right of FIG. 3 (e.g., the higher the temperature is, the lower the voltage level of AGND is). To the inverting input terminal of the operational amplifier OP1, VAoff(=AGND+Voffm) is applied. Voffm=−Voff is satisfied.

As described above, the voltage level of the temperature compensation voltage Voffm does not depend on a temperature. Accordingly, when the voltage level of the voltage AGND varies in accordance with the ambient temperature, the voltage level of the voltage VAoff varies, and accuracy of the offset compensation is lowered.

The voltage level of AGND at room temperature (here, 25 degrees centigrade) is referred to as AGND (25° C.). The temperature compensation voltage Voffm is to remove the offset voltage Voff at room temperature (25 degrees centigrade). Accordingly, it is preferable that the temperature compensation voltage Voffm is always added to AGND (25° C.). In the embodiment, as shown in the lower right of FIG. 3, the voltage level of the voltage AGND is always maintained at AGND (25° C.) by adding the temperature compensation voltage VTS. Therefore, in the embodiment, offset compensation with high accuracy can be always performed regardless of the ambient temperature.

Layout Structure to Prevent Mutual Interference Between Offset Compensation Voltage Voffm and Temperature Compensation Voltage VTS As described above, the offset voltage Voff is expressed as a potential difference (a voltage difference) with respect to the voltage AGND. When the voltage level of the offset voltage Voff which is generated by a source of the offset voltage varies in accordance with the ambient temperature, the analog reference voltage AGND also varies in the same manner. Therefore, the potential difference between both voltages can be regarded as unchanged. That is, the offset voltage Voff is a specific voltage for each sensing circuit (IC) 900, and does not depend on the temperature. Therefore, the offset compensation voltage Voffm does not depend on the temperature so as to be constant.

On the other hand, the temperature compensation voltage VTS is used for compensating variation caused by the temperature of the analog reference voltage AGND itself, and the voltage value varies in accordance with the ambient temperature. Therefore, in the circuit shown in FIG. 1, the voltage Voffm which is a direct current voltage and does not depend on the temperature and the voltage VTS which depends on the temperature need to be added independently at the same place (an input terminal of the synchronous detection circuit).

Therefore, as shown in FIG. 3, "Voffm" and "VTS" are added to the input terminal of the operational amplifier (e.g., the differential amplifier) OP1 in parallel. In this case, an output voltage of the inverting amplifier reflects each of "Voffm" and "VTS." That is, the level of the output voltage of the operational amplifier OP1 varies depending on each of "Voffm" and "VTS."

The offset compensation voltage Voffm is input into the inverting input terminal (the first input node) of the operational amplifier (the differential amplifier) OP1, and the temperature compensation voltage VTS is input into the non-inverting input terminal (the second input node) of the operational amplifier (the differential amplifier) OP1, for example.

At this time, a layout structure which can prevent mutual interference between the offset compensation voltage Voffm and the temperature compensation voltage VTS is preferably employed. That is, a voltage of the inverting input terminal is expressed as VAoff=AGND+Voffm, and a voltage of the non-inverting input terminal is expressed as Vtemp=AGND+VTS. The voltages VAoff and Vtemp of each terminal must be electrically independent.

In a layout structure which cannot ensure electrical independence of the offset compensation voltage Voffm and the temperature compensation voltage VTS, the temperature compensation voltage VTS may leak in the offset compensation circuit 210 through an AGND wiring line, for example. In this case, the voltage level of the offset compensation voltage Voffm (which should not depend on the temperature, originally) varies depending on the temperature, so that independence of the temperature compensation voltage VTS and the offset compensation voltage Voffm is not guaranteed. That is, the voltage level of Voffm (which does not have temperature dependence, originally) depends on the ambient temperature and varies due to an influence of VTS. In this case, two compensation voltages which are electrically independent from each other are not generated.

In a case of FIG. 3, the analog reference voltage AGND is supplied to each of the offset compensation circuit 210 and the temperature compensation circuit 220 through a common AGND wiring line L1. The AGND generator circuit 226 is provided between the offset compensation circuit 210 and the temperature compensation circuit 220. Here, a common connection point of the AGND wiring line L1 and the AGND generator circuit 226 is referred to as a Z point, and the voltage applied to the Z point is referred to as VZ. An output impedance of the AGND generator circuit 226 is extremely small, so that the potential VZ of the Z point is always maintained at the analog reference voltage AGND. Accordingly, the offset compensation voltage Voffm and the temperature compensation voltage VTS are electrically isolated, and their electrical independence is maintained. That is, even if the potential of the AGND wiring line L1 slightly varies by the temperature compensation voltage VTS, the potential variation is all absorbed at the Z point. Therefore, the temperature compensation voltage VTS does not leak in the offset compensation circuit 210.

In the case of FIG. 3, the common AGND wiring line L1 is used as an AGND wiring line of the offset compensation circuit 210 and that of the temperature compensation circuit 220, so that the layout structure can be simplified. In addition, the following layout structure may be employed. That is, a structure that a first AGND generating circuit for the offset compensation circuit 210 is provided, a second AGND generating circuit for the temperature compensation circuit 220 is provided, the offset compensation circuit 210 and the first AGND generating circuit is coupled by a first AGND wiring line, and the temperature compensation circuit 220 and the second AGND generating circuit is coupled by a second AGND wiring line (i.e., a layout structure in which the voltage Voffm and the voltage VTS are electrically isolated, and further physically isolated).

As described, in FIG. 3, the analog reference voltage AGND for two input terminals (the first and the second input nodes) of the operational amplifier OP1 is electrically isolated from each other. Accordingly, the temperature compensation voltage VTS and the offset compensation voltage Voffm can be independently added to the two input terminals (the first and the second input nodes) of the inverting amplifier to be added independently.

Demonstration with Equations

Hereinafter, equations proves that the voltage Voffm and the voltage VTS can be independently added. In the following description, Vin=AGND+Vac·sin ωt is satisfied. Voffm denotes the offset compensation voltage and VTS denotes the temperature compensation voltage. In addition, Vy denotes the voltage of an output terminal of the operational amplifier OP1, and SDET denotes a reference signal of the synchronous detection.

When a node of the inverting input terminal of the operational amplifier OP1 in the synchronous detection unit 209 of the synchronous detection circuit 600 is a node X, the inverting input terminal and the non-inverting input terminal have the same potential by a virtual short. A current equation at the node X can be expressed as Equation (1) by Kirchhoff's current equation.

$$\frac{Vin-(AGND+VTS)}{R1}+ \qquad (1)$$
$$\frac{(AGND+Voffm)-(AGND+VTS)}{R2}+\frac{Vy-(AGND+VTS)}{R3}=0$$

When Equation (1) is solved for Vy, Equations (2) and (3) are obtained.

$$Vy = -\frac{R3}{R1}(Vin-AGND-VTS) - \qquad (2)$$
$$\frac{R3}{R2}(AGND+Voffm-AGND-VTS)+AGND+VTS$$

$$Vy = -\frac{R3}{R1}(Vin-AGND-VTS) - \frac{R3}{R2}(Voffm-VTS)+AGND+VTS \qquad (3)$$

Here, when the input signal is substituted for Vin, and the equation is rearranged for Vy, Equations (4) to (6) are obtained.

$$Vy = -\frac{R3}{R1}(AGND+V_{AC}\sin\omega t-AGND-VTS) - \qquad (4)$$
$$\frac{R3}{R2}(Voffm-VTS)+AGND+VTS$$

$$Vy = -\frac{R3}{R1}(V_{AC}\sin\omega t-VTS) - \frac{R3}{R2}(Voffm-VTS)+AGND+VTS \qquad (5)$$

$$Vy = -\frac{R3}{R1}V_{AC}\sin\omega t+AGND-\frac{R3}{R2}Voffm-VTS+\left(1+\frac{R3}{R1}+\frac{R3}{R2}\right) \qquad (6)$$

A gain of a common inverting amplifier for synchronous detection is −1, so that R1=R3 is satisfied. Thus, Equation (7) is obtained.

$$Vy = -V_{AC}\sin\omega t+AGND-\frac{R3}{R2}Voffm+\left(2+\frac{R3}{R1}\right)VTS \qquad (7)$$

Here, if the input sine wave is in phase with the reference signal SDET and a duty ratio of the signal SDET is 50%, the output voltage of the synchronous detection output Vout is expressed as Equation (8).

$$Vout = \frac{1}{2}\left\{\begin{array}{c}\frac{2}{\pi}V_{AC}+AGND- \\ \frac{R3}{R2}Voffm+\left(2+\frac{R3}{R1}\right)VTS\end{array}\right\}+\frac{1}{2}\left(\frac{2}{\pi}V_{AC}\sin\omega t+AGND\right) \qquad (8)$$

In Equation (8), the first term indicates an output of the inverting amplifier, and the second term indicates an output when the signal Vin is output as it is. Therefore, Equation (9) is obtained. Equation (10) is obtained by rearranging Equation (9).

$$Vout = \frac{2}{\pi}V_{AC}+AGND+\frac{1}{2}\left\{-\frac{R3}{R2}Voffm+\left(2+\frac{R3}{R2}\right)VTS\right\} \qquad (9)$$

$$Vout = \frac{2}{\pi}V_{AC}+AGND-\frac{1}{2}\frac{R3}{R2}Voffm-\frac{1}{2}\left(2+\frac{R3}{R2}\right)VTS \qquad (10)$$

Therefore, a normal synchronous detection is performed, and the reference voltage AGND stays as it is. Further, the offset compensation voltage Voffm and the temperature compensation voltage VTS are independently added.

Addition by the Principle of Superposition

Next, addition by using the principle of superposition will be described. The offset compensation voltage Voffm and the temperature compensation voltage VTS must be independently added. Therefore, each of two compensation voltages needs to be superposed on the signal path by using the principle of superposition. The principle of superposition is such that, in a linear electric circuit having a plurality of voltage sources, a voltage at any point equals to a sum of voltages of the plurality of the voltage sources when they exist singly. In order to apply the principle of superposition, a linearity of the signal path needs to be ensured.

Specifically, for example, when the temperature compensation voltage VTS is applied to the non-inverting input terminal (the second input node) of the inverting amplifier, it must be ensured that a level of an output signal of the inverting amplifier varies linearly by only depending on the temperature compensation voltage VTS (otherwise, a voltage component which is superposed on the voltage AGND and varies in accordance with the temperature can not be canceled). Therefore, an impedance of the offset compensation circuit when viewed from a common connection node (referred to as the node X) of the inverting input terminal (the first input node) of the inverting amplifier and the offset compensation circuit needs to be always constant. That is, the impedance of the offset compensation circuit in regard to the inverting input terminal (the first input node) of the inverting amplifier is preferably constant regardless of an operating state of the offset compensation circuit.

If the impedance of the offset compensation circuit varies in accordance with the state of the offset compensation circuit, an amount of the current flowing between the node X and the offset compensation circuit varies in accordance with the state of the offset compensation circuit. Accordingly, the voltage of the node X varies, and correspondingly, the output of the inverting amplifier also varies. In this case, the output of the inverting amplifier does not follow "varying linearly only according to the voltage level of the temperature compensation voltage VTS applied to the non-inverting input terminal of the inverting amplifier," so that the linearity of the signal path does not ensured.

The offset compensation circuit 210 is designed so that the impedance of the offset compensation circuit 210 when viewed from the first input node (the node X in FIG. 3) of the inverting amplifier can be constant regardless of an operating state of the offset compensation circuit 210. Accordingly, the offset compensation voltage Voffm and the temperature compensation voltage VTS can be independently added by the principle of superposition.

Second Embodiment

In the embodiment, an example of a circuit structure of the offset compensation circuit 210 (an example of using a D/A converter of an R2R ladder type) will be described.

Structure of Offset Compensation Circuit

Figure 4:
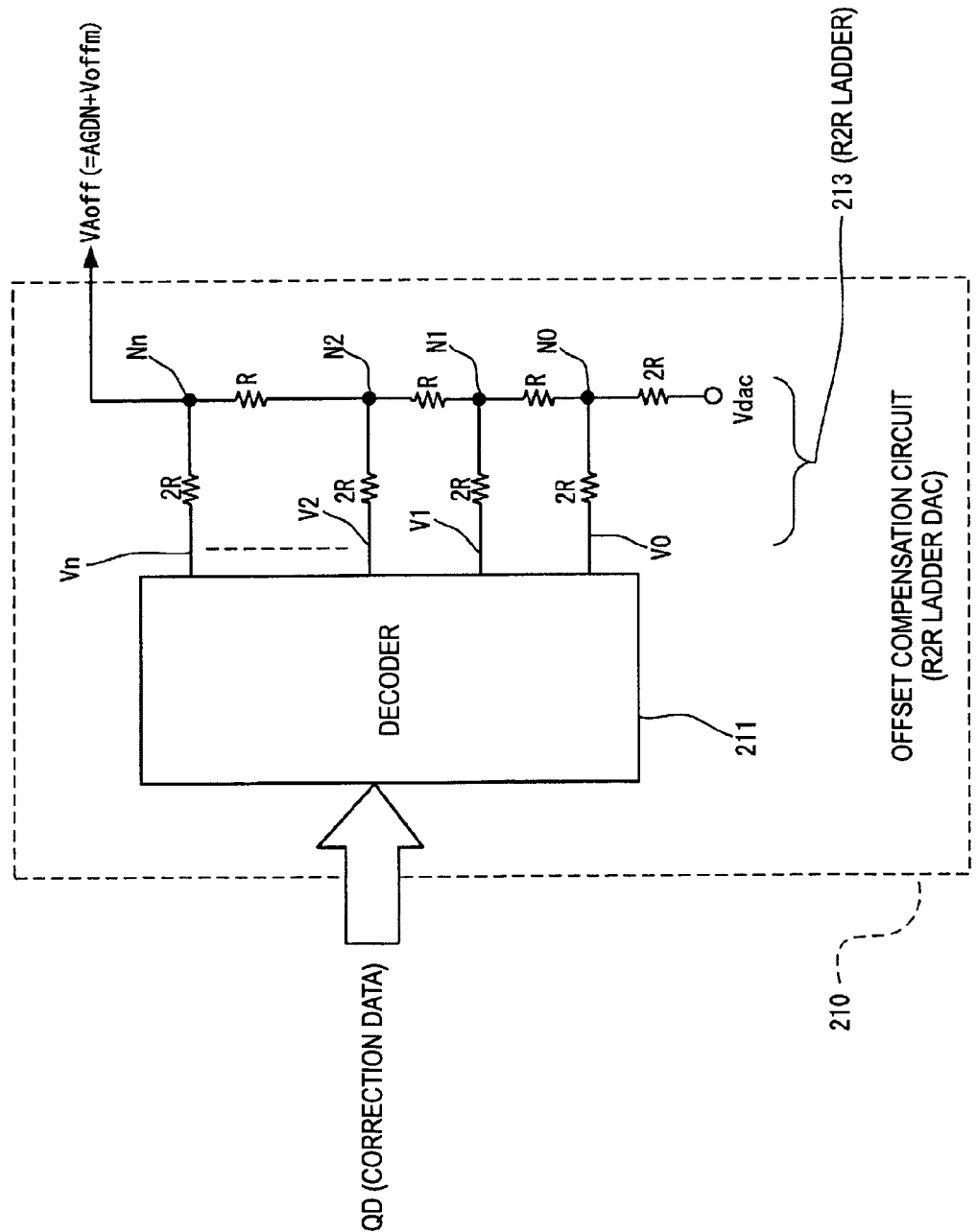
FIG. 4 is a circuit diagram showing a structure of an offset compensation circuit which is an R2R ladder type D/A converter circuit.

FIG. 4 is a circuit diagram of showing a structure of a D/A converter circuit of an R2R ladder type as an offset compensation circuit. An R2R ladder 213 includes two kinds of unit resistances (a resistance R and a resistance 2R) coupled in a ladder shape. A decoder 211 decodes the input correction data QD so as to output a digital data (i.e., voltage V0 to Vn) of (n+1) bit.

Figure 5A:
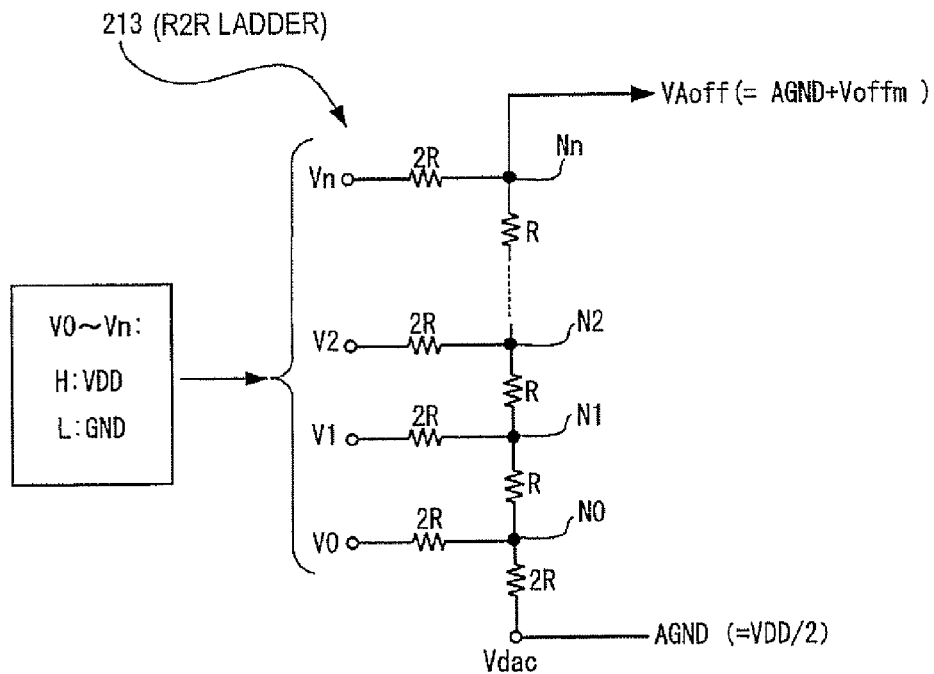
FIGS. 5A and 5B are diagrams for explaining an operation of the R2R ladder type circuit.
Figure 5B:
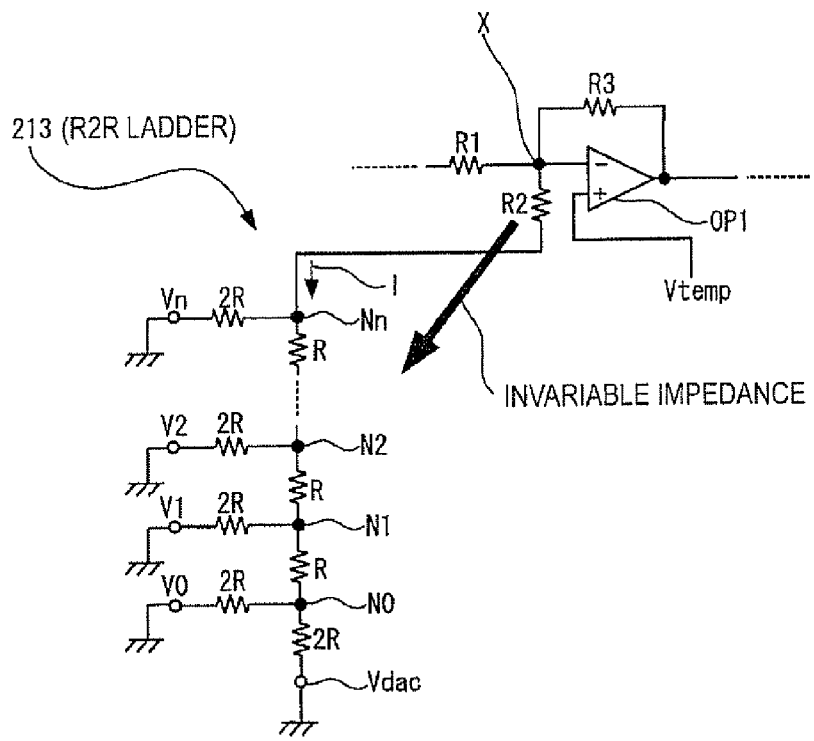

FIGS. 5A and 5B are diagrams for explaining an operation of the R2R ladder type circuit shown in FIG. 4. In FIG. 5A, an "H" level of each of the voltages V0 to Vn is VDD, and an "L" level is GND, for example. In addition, a reference voltage Vdac of the D/A converter circuit is the voltage AGND, for example. Turning each of the voltages V0 to Vn to the "H" level or the "L" level can vary a voltage level of a voltage VAoff(=AGND+Voff) output from the R2R ladder type circuit varies.

Hereinafter, this is described with equations. Referring to FIG. 5A, when a current equation at a node N0 is solved, Equations (11) to (13) are obtained.

$$\frac{N_0 - V_{doc}}{2R} + \frac{N_0 - V_0}{2R} + \frac{N_0 - N_1}{R} = 0 \tag{11}$$

$$N_0 - N_{doc} + N_0 - V_0 + 2N_0 - 2N_1 = 0 \tag{12}$$

$$4N_0 = V_{doc} + V_0 + 2N_1 \tag{13}$$

In addition, when a current equation at a node N1 is solved, Equations (14) to (17) are obtained.

$$\frac{N_1 - N_0}{R} + \frac{N_1 - V_1}{2R} + \frac{N_1 - N_1}{R} = 0 \tag{14}$$

$$2N_1 - 2N_0 + N_1 - V_1 + 2N_1 - 2N_2 = 0 \tag{15}$$

$$5N_1 = 2N_0 + V_1 + 2N_2 \tag{16}$$

$$10N_1 = 4N_0 + 2V_1 + 4N_2 \tag{17}$$

Here, from Equation (13) above, Equations (18) and (19) are obtained.

$$10N_1 = V_{doc} + V_0 + 2N_1 + 2V_1 + 4N_2 \tag{18}$$

$$8N_2 = V_{doc} + V_0 + 2V_1 + 4N_2 \tag{19}$$

In addition, when a current equation at a node N2 is solved, Equations (20) to (23) are obtained.

$$\frac{N_2 - N_1}{R} + \frac{N_2 - V_2}{2R} = 0 \tag{20}$$

$$2N_2 - 2N_1 + N_2 - V_2 = 0 \tag{21}$$

$$3N_2 = 2N_1 + V_2 \tag{22}$$

$$12N_2 = 8N_1 + 4V_2 \tag{23}$$

Here, from Equation (19) above, Equations (24) to (26) are obtained.

$$12N_2 = V_{doc} + V_0 + 2V_1 + 4N_2 + 4V_2 \tag{24}$$

$$8N_2 = V_{doc} + V_0 + 2V_1 + 4V_2 \tag{25}$$

$$N2 = \frac{V_{doc} + 2^0 x V_0 + 2^1 x V_3 + 2^2 x V_2}{2^3} \tag{26}$$

That is, when a current equation at a node Nn is solved, Equation (27) below is obtained.

$$N_n = \frac{V_{doc} + 2^0 x V_0 + 2^1 x V_1 + \ldots + 2^n x V_n}{2^{n+1}} \tag{27}$$

A voltage of the node Nn varies according to voltage values of the voltages Vdac, V0, and V1 through Vn. If GND, VDD, AGND or other reference voltage (Vref) is input as each of the voltage values of the voltages Vdac, V0, and V1 through Vn, the voltage of the node Nn varies. Thus, VAoff(=AGND+Voffm) can be produced.

Next, with FIG. 5B, it will be described that the impedance at the D/A converter circuit of the R2R ladder type when viewed from the node X is constant.

For example, all of the voltages V0 to Vn are set to be GND. An equivalent circuit of the R2R ladder type circuit in this case is shown as FIG. 5B. The resistance of a part inputting the voltages V0 to Vn is extremely low, so that the resistance can be ignored. Accordingly, the impedance of the R2R ladder type circuit is unambiguously determined by the equivalent circuit of FIG. 5B. That is, the impedance of the D/A converter circuit of the R2R ladder type when viewed from the node X is always constant. Therefore, as described above, the principle of superposition can be applied.

Third Embodiment

Figure 6:
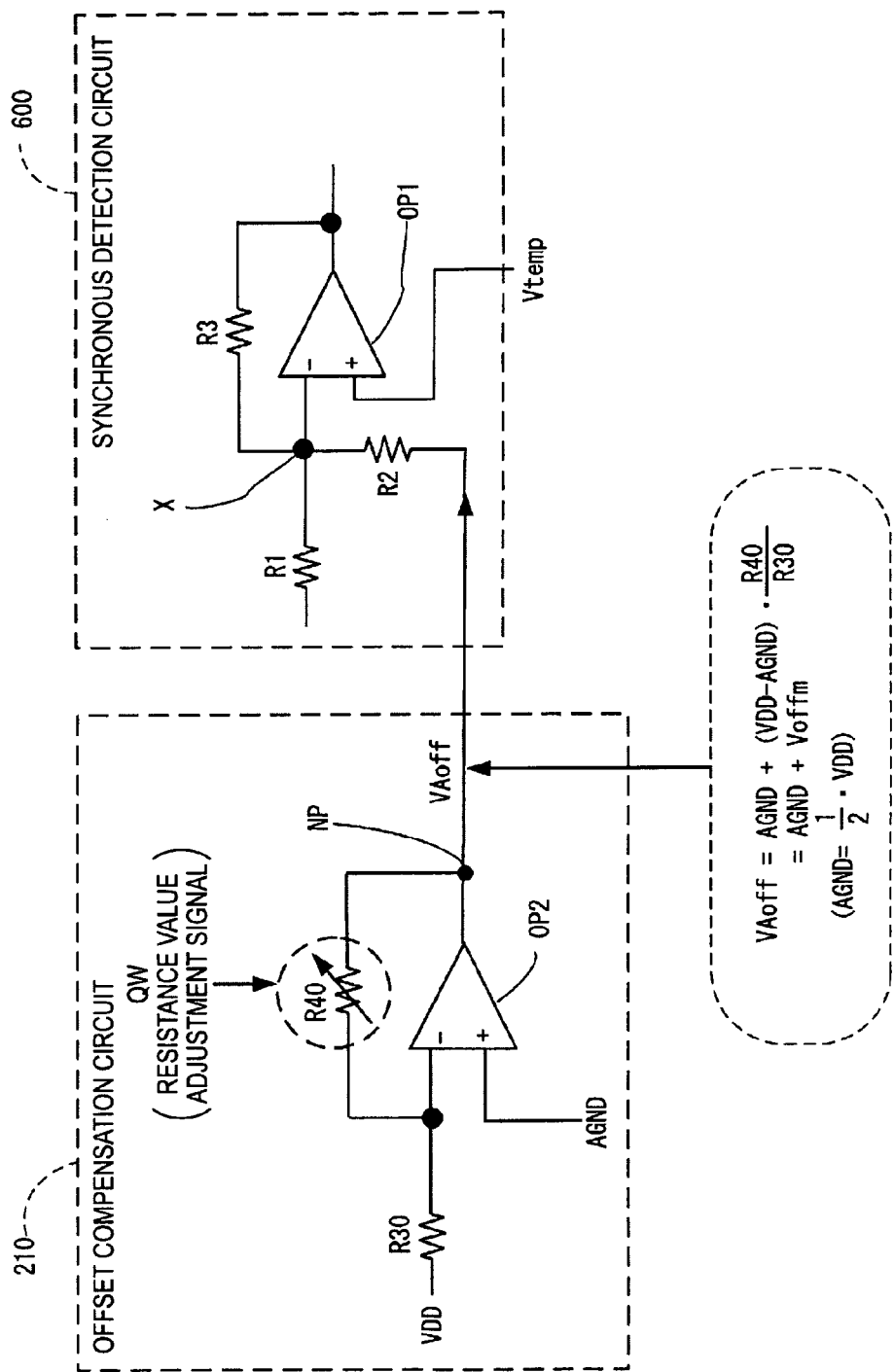
FIG. 6 is a circuit diagram showing another structure of the offset compensation circuit.

In the embodiment, a modification of an offset compensation circuit will be described. FIG. 6 is a circuit diagram for explaining another circuit structure of the offset compensation circuit.

As FIG. 6 shows, the offset compensation circuit 210 has an inversion amplifier including an input resistance R30, a feedback resistance R40, and an operational amplifier OP2. The feedback resistance R40 is a variable resistance. The resistance value of the feedback resistance R40 varies by a resistance adjustment signal QW so as to arbitrarily vary a level of an output voltage of the inversion amplifier (i.e., the offset compensation voltage).

In addition, since an output impedance of the operational amplifier OP2 is extremely low, the impedance when viewed from the node X is always constant.

A high level power supply voltage VDD is input into an inverting input terminal of the operational amplifier OP2, and the analog reference voltage AGND is input into a non-inverting input terminal. The inversion amplifier amplifies a voltage difference between the voltage VDD and the voltage AGND. AGND is VDD/2, for example. The voltages VDD and AGND similarly vary with respect to the temperature. Accordingly, the voltage difference (=VDD−AGND) between these voltages does not vary in accordance with the temperature. Therefore, if a gain of the operational amplifier is appropriately adjusted, a voltage in which the analog reference voltage AGND is superposed on the offset compensation voltage Voffm (a voltage of which a voltage value does not vary in accordance with the temperature) can be produced.

The output voltage VAoff of the inversion amplifier shown in FIG. 6 is expressed as the following equation.

$$VAoff = AGND + (VDD - AGND) \cdot R40/R30$$

In the equation above, Voffm is substituted for (VDD−AGND)·R40/R30 so as to obtain VAoff=AGND+Voffm. Therefore, an offset compensation voltage can be generated with respect to the voltage AGND as a reference level. The offset compensation circuit of FIG. 6 has a simple circuit structure. Thus, an occupation area and cost can be reduced.

Fourth Embodiment

Figure 7:
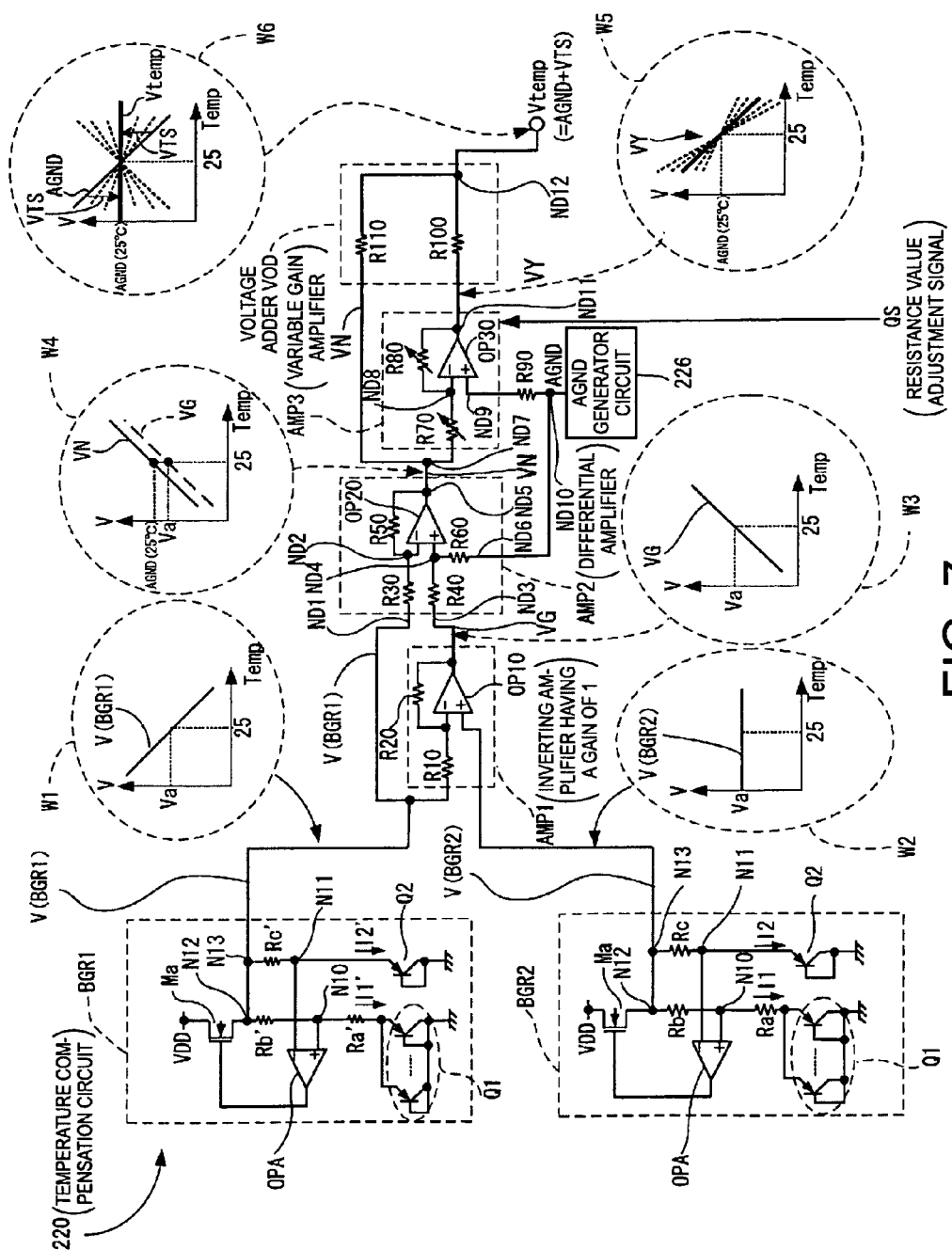
FIG. 7 is a diagram for explaining a structure and an operation of a temperature compensation circuit.

In the embodiment, an example of a specific structure of the temperature compensation circuit 220 shown in FIG. 1 and its operation will be described.
Specific Structural Example and Operation of Temperature Compensation Circuit FIG. 7 is a diagram for explaining an example of a structure and an operation of a temperature compensation circuit. As FIG. 7 shows, the temperature compensation circuit 220 includes a first and a second band gap circuits (reference voltage generating circuits) BGR1 and BGR2 having the same circuit structure, an inverting amplifier AMP1 having a gain of 1, a differential amplifier AMP2, a variable gain amplifier AMPS, a voltage adder VOD, and an AGND generator circuit 226. FIG. 7 shows voltage characteristics of the main voltage in the temperature compensation circuit 220 with respect to the temperature. The characteristics are circled with dotted lines (refer to W1 to W6 of FIG. 7).

In FIG. 7, for convenience of description, VBGR1 is a first voltage, VBGR2 denotes a second voltage, VG denotes a third voltage, VN denotes a fourth voltage, VY denotes a fifth voltage, and the temperature compensated voltage Vtemp denotes a sixth voltage.
Structure and Operation of Band Gap Circuits BGR1 and BGR2

The first band gap circuit BGR1 (hereafter, referred to as BGR1) and the second band gap circuit BGR2 (hereafter, referred to as BGR2) have the same circuit structure as each other. However, in BGR1, Ra' is used as a first resistance, Rb' is used as a second resistance, and Rc' is used as a third resistance. On the other hand, in BGR2, Ra is used as a first resistance, Rb is used as a second resistance, and Rc is used as a third resistance. By having the same circuit structure, BGR1 and BGR2 obtain the uniform characteristics.

BGR1 and BGR2 are preferably manufactured by the same semiconductor process technique and disposed adjacent to each other. In this way, variation of elements constituting the circuit BGR1 and that of elements constituting the circuit BGR2 become the same, so that ratio accuracy of the resistance can be improved. That is, the resistance value of the first resistances Ra and Ra' have high ratio accuracy. The second resistances Rb and Rb', the third resistances Rc and Rc' are also the same. Thus, when BGR1 and BGR2 have the same circuit structure and each resistance has high ratio accuracy, levels of the output voltages of BGR1 and BGR2 can be always the same voltage value Va at room temperature (e.g., 25 degrees centigrade).

From BGR1, a first voltage V(BGR1), a signal increasing in proportion to the temperature, is obtained. On the other hand, from BGR2, a second voltage V(BGR2), a constant voltage which does not depend on the temperature, is obtained.

An operation of BGR1 and BGR2 will be described below. Since the basic structure and operation are the same, the operation of BGR2 will be described below.

In FIG. 7, OPA denotes an operational amplifier, Ra, Rb, and Rc respectively denote the first, second, and third resistances. In addition, Q1 and Q2 denote PN junction diodes (diode-connected PNP transistors). The PN junction diode Q1 includes n number of transistors having the same size as the diode Q2 and are coupled in parallel. A junction area of the PN junction diode Q1 is n times (n is an integer 2 or more) as large as the PN junction diode Q2. If I1=I2 is satisfied, for example, when I1 is current that flows the PN junction diode Q1 and I2 is current that flows the PN junction diode Q2, a current density ratio of the PN junction diodes Q1 and Q2 is 1:n.

In addition, an input terminal of the operational amplifier OPA is imaginary shorted, so that potentials of nodes N10 and N11 are equivalent.
Therefore, the following Equation (28) is derived.

$$Vbe(Q2) = Vbe(Q1) + V(Ra) \tag{28}$$

Here, Vbe(Q2) denotes a forward voltage of the PN junction diode Q2. Vbe(Q1) denotes a forward voltage of the PN junction diode Q1. V(Ra) denotes a voltage across the first resistance Ra.
From Equation (28), Equation (29) below is formed.

$$V(Ra) = Vbe(Q2) - Vbe(Q1) \tag{29}$$

Here, a temperature coefficient of V(Ra) (i.e., a coefficient obtained by partially differentiating V(Ra) with the temperature) is denoted as K1. Similarly, a negative temperature coefficient of the voltage Vbe(Q2) (a coefficient obtained by partially differentiating Vbe(Q2) with the temperature) is denoted as K2, and a negative temperature coefficient of Vbe(Q1) (a coefficient obtained by partially differentiating Vbe(Q1) with the temperature) is denoted as K3. Since the PN junction diodes Q1 and Q2 are biased with the different current density, an absolute value of the negative temperature coefficient K3 of the voltage Vbe(Q1) is larger than that of the negative temperature coefficient K2 of the voltage Vbe(Q2). Therefore, the temperature coefficient of V(Ra) is positive. That is, the negative temperature coefficient K3 having a larger absolute value than K2 is subtracted from the negative temperature coefficient K2, resulting in obtaining the positive temperature coefficient K3.

In other words, the voltage across the first resistance Ra has a positive temperature coefficient (i.e., a tendency to increase as the temperature increases). This means that the current I1 that flows through the first resistance Ra has the positive temperature coefficient (a tendency to increase as temperature increases). The current I1 having the positive temperature coefficient flows to the second resistance Rb, so that a voltage V(Rb) having a positive temperature coefficient is generated at the second resistance Rb. V(BGR2), an output voltage of BGR2, is expressed as V(BGR2)=Vbe(Q2)+V(Rb). Then, each resistance values of the first to the third resistances Ra to Rc and the junction area of the PN junction diode Q1 (i.e., a value of n above) are appropriately set so as to almost completely cancel out the negative temperature coefficient of Vbe(Q2) by the positive temperature coefficient V(Rb). Therefore, the output voltage V(BGR2) of BGR2 becomes a voltage which does not depend on the temperature (a constant voltage Va) (refer to a characteristic diagram W2 circled with the dotted lines in FIG. 7).

Hereinafter, the details will be described. As described above, the current which flows through the third resistance Rc and the PN junction diode Q2 is denoted as I2, and the current which flows through the second resistance Rb and the PN junction diode Q1 is denoted as I1. The forward voltages of the PN junction diode Q1 and Q2 are respectively Vbe(Q1)

and Vbe(Q2). From the rectification equation of diode, the voltages Vbe(Q1) and Vbe(Q2) can be expressed as Equations (30) and (31).

$$Vbe(Q1)=(kT/q)\ln(I1/Is(Q1)) \quad (30)$$

$$Vbe(Q2)=(kT/q)\ln(I2/Is(Q2)) \quad (31)$$

In the equations above, k denotes Boltzmann constant, T denotes an absolute temperature, q denotes an elementary charge, and Is(Q1) and Is(Q2) respectively denote saturated currents of the PN junction diodes Q1 and Q2.

In addition, in regard to the second and the third resistances Rb and Rc, Equation (32) below is formed.

$$I2:I1=Rb:Rc \quad (32)$$

Accordingly, the following Equation (33) is derived.

$$I1=I2 \cdot Rc/Rb \quad (33)$$

When equations (30) and (31) are substituted into Equation (29), the voltage across the first resistance V(Ra) is expressed as Equation (34) below.

$$V(Ra)=(kT/q)\ln(I2 \cdot Is(Q1)/I1 \cdot Is(Q2)) \quad (34)$$

Further, Equation (33) is substituted into Equation (34), so that Equation (35) below is obtained.

$$V(Ra)=(kT/q)\ln(Rb \cdot Is(Q1)/Rc \cdot Is(Q2)) \quad (35)$$

Here, the output voltage V(BGR2) of the band gap circuit BGR2 is expressed as Equation (36) below.

$$V(BGR2)=V(Ra) \cdot Rb/Ra+Vbe(Q2) \quad (36)$$

Further, Equation (35) is substituted into Equation (36), so that Equation (37) is obtained.

$$V(BGR2)=(Rb/Ra)(kT/q)\ln(Rb \cdot Is(Q1)/Rc \cdot Is(Q2))+Vbe(Q2) \quad (37)$$

Here, for example, the PN junction diode Q1 has a structure that n number of bipolar transistors (n is an integer 2 or more) having the exact same layout pattern as the PN junction diode Q2 are connected in an array in parallel. In this case, the saturated current Is(Q1) of the PN junction diode Q1 is n times as large as the saturated current Is(Q2) of the PN junction diode Q2. Therefore, Equation (38) below is formed.

$$Is(Q1)=n \cdot Is(Q2) \quad (38)$$

Here, Equation (38) is substituted into Equation (38), so that Equation (39) below is obtained.

$$V(BGR2)=(Rb/Ra)(kT/q)\ln(n \cdot Rb/Rc)+Vbe(Q2) \quad (39)$$

The resistance value of resistances Ra, Rb, and Rc and the n number of bipolar transistors coupled in parallel in the PN junction diode Q1 are constant all determined by designing. A constant G is defined as the following Equation (40).

$$G=(Rb/Ra)\ln(n \cdot Rb/Rc) \quad (40)$$

When V(BGR2) is expressed using the constant G, Equation (41) below is obtained.

$$V(BGR2)=G \cdot (kT/q)+Vbe(Q2) \quad (41)$$

Here, a thermal voltage (kT/q) is a linear function having a positive slope k/q (e.g., 0.085 mV/° C.) with respect to the temperature T. In addition, Vbe(q2) is determined by the thermal voltage (kT/q) and temperature dependency (a temperature characteristic) of the saturated current Is (Q2) of the PN junction diode Q2. The saturated current Is (Q2) of the PN junction diode Q2 has the temperature dependency which is a substantially linear of about −2 mV/° C., for example. Therefore, in the example above, if the constant G has a value of about "23" (≈−Is/(kT/q)), the output voltage V(BGR2) can be a constant voltage having no temperature dependency.

The operation of the bang gap circuit BGR2 is specifically described above. Similarly, in the band gap circuit BGR1, each resistance value of the first to the third resistances Ra' to Rc' is appropriately set, so that the negative temperature coefficient of Vbe(Q2) is not completely canceled out by the positive temperature coefficient of V(Rb). Therefore, the output voltage V(BGR1) of BGR1 has a characteristic (i.e., the negative temperature coefficient) that the voltage level decreases as the temperature increases (refer to a characteristic diagram W1, circled with the dotted lines in FIG. 7, of V(BGR1)).

That is, in the example above, if the constant G is less than "23," for example, the negative temperature coefficient of the voltage Vbe(Q2) can not be completely canceled out. Accordingly, the output voltage V(BGR1) of the band gap circuit BGR1 can have a characteristic that monotonically decreases by depending on the temperature.

The band gap circuits BGR1 and BGR2 have the same circuit structure, and are preferably manufactured by the same semiconductor process and disposed adjacent to each other. Thus, the transistors and the resistances have high ratio accuracy. Two band gap circuits have uniform characteristics so that both band gap circuits BGR1 and BGR2 output the same voltage (e.g., the voltage Va) at room temperature (e.g., 25 centigrade). An error between levels of output voltages of the bang gap circuits BGR1 and BGR2 at room temperature causes an error when these voltages are added by the differential amplifier AMP2. Therefore, the band gap circuits BGR1 and BGR2 preferably have the same circuit structure. It is more preferable that BGR1 and BGR2 are manufactured by the same semiconductor process, and are disposed adjacent to each other. Thus, the two band gap circuits BGR1 and BGR2 can have the uniform characteristics with high accuracy.

The circuit structure of the band gap circuits BGR1 and BGR2 is not limited to the one shown in FIG. 7, but various structures may be employed. For example, a current mirror circuit may be employed instead of the operational amplifier OPA. In addition, a band gap circuit using a subthreshold voltage of a MOS transistor may be used.

Structure and Operation of Inverting Amplifier (Specifically, Inverting Amplifier Having Gain of 1) AMP1

In FIG. 7, the output voltage V(BGR2) of the band gap circuit BGR2 is input into a non-inverting input terminal of the inverting amplifier AMP1 having a gain of 1. The inverting amplifier AMP1 includes an operational amplifier OP10, a resistance 10, and a resistance 20. In the inverting amplifier AMP 1, the resistance value of the resistance 10 and that of the resistance 20 are equal to each other. That is, R10=R20 is satisfied. In such an expression, R10 denotes the resistance value of the resistance 10, and R20 denotes the resistance value of the resistance 20 (same in the following description). However, due to a circuit structure, the resistance values of the resistances R10 and R20 may be different from each other.

The output voltage V(BGR1) of the band gap circuit BGR1 is input into a non-inverting input terminal of the operational amplifier OP10 through the resistance R10. The output voltage V(BGR2) of the band gap circuit BGR2 is directly input into a non-inverting input terminal of the operational amplifier OP10. Accordingly, the inverting amplifier AMP1 inverts and amplifies a difference between the voltage V(BGR2) and V(BGR1) by a gain of 1. The voltage V(BGR2) does not depend on the temperature, and V(BGR1) has the characteristic of monotonically decreasing with respect to the temperature. From the inverting amplifier AMP1, a voltage VG (a third voltage) is obtained. The voltage VG depends on the temperature, and its voltage value increases as the temperature increases (refer to a characteristic diagram W3, circled with the dotted lines in FIG. 7, of VG). The two band gap circuits (BGR1 and BGR2) have uniform characteristics, so that a temperature characteristic of the voltage VG is determined with high accuracy. In addition, since the inverting amplifier AMP1 is a differential amplifier, a noise superimposed on the two inputs (V(BGR1) and V(BGR2)) and having the same polarity is canceled out, thereby noise reduction is realized.

Structure and Operation of Difference Amplifier AMP2

In FIG. 7, a first node ND1 to a twelfth node ND12 are respectively set so as to describe a structure and an operation of the differential amplifier AMP2. These nodes are mainly used for specifying precise positions of resistances and potentials at main points.

The output voltage V(BGR1) of the band gap circuit BGR1 and the output voltage VG of the inverting amplifier AMP 1 are respectively input into an inverting input terminal and an non-inverting input terminal of the differential amplifier AMP2.

The differential amplifier AMP2 includes an operational amplifier OP20, a first resistance R30, a second resistance R40, a third resistance R50, and a fourth resistance R60. The first resistance R30 is coupled between the first node ND1 and the second node (an inverting input terminal of the operational amplifier OP20) ND2. The second resistance R40 is coupled between the third node ND3 and the fourth node (a non-inverting input terminal of the operational amplifier OP20) ND4. The third resistance R50 is coupled between the fifth node (an output node of the operational amplifier OP20) ND5 and the second node ND2. The fourth resistance R60 is coupled between the fourth node ND4 and the sixth node (an AGND node) ND6.

To the sixth node ND6, an analog reference voltage (a direct current bias voltage) AGND generated by the AGND generator circuit 226 is applied. It is because a reference voltage for generating a temperature compensated reference voltage Vtemp is the voltage AGND.

As described with reference to FIG. 1, a role of the temperature compensation circuit 220 is to maintain the voltage level of the analog reference voltage (the direct current bias voltage) AGND on the signal transmission path at the voltage level (i.e., AGND (25° C.)) of room temperature (25 centigrade) regardless of a change in the ambient temperature, for example. As shown in FIG. 1, the temperature compensation voltage VTS for canceling a temperature offset is superposed on the reference voltage AGND. If a voltage obtained by superposing the temperature compensation voltage VTS with the actual analog reference voltage AGND is referred to as the temperature compensated reference voltage Vtemp, for example, the following equation is satisfied in a wide range of the temperature. Vtemp=AGND+VTS=AGND (25° C.) where the AGND (25° C.) indicates a voltage level of the reference voltage AGND at room temperature. In order to generate the temperature compensated reference Vtemp, a circuit operation based on the voltage AGND is required. Therefore, the voltage AGND is applied to a non-inverting input terminal (the fourth node ND4) of the operational amplifier.

Adjusting the resistance value of the first resistance R30 to the fourth resistance R60 allows adjusting a gain of the differential amplifier AMP2. Here, the resistance values of the resistances R30 and R40 are preferably set to be equal. In addition, the resistance values of the resistances R50 and R60 are preferably set to be equal. That is, in the differential amplifier AMP2, R30=R40 and R50=R60 are preferably satisfied.

Figure 11:
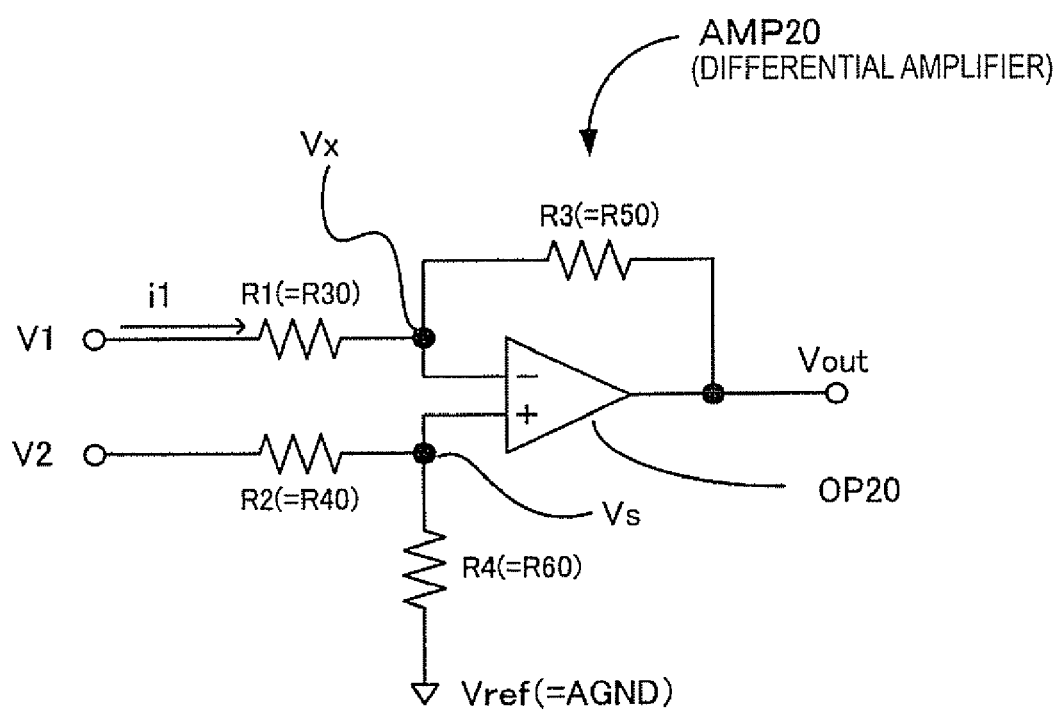
FIG. 11 is a diagram for explaining a transfer function of a differential amplifier shown in FIG. 7.

The differential amplifier AMP2 basically multiplies a voltage difference between the voltage V(BGR1) and the voltage VG by −(R50/R30) (a specific operation will be described with reference to FIG. 11).

As a result, a voltage VN is obtained from an output node ND5 of the differential amplifier AMP2. The voltage VN has a characteristic (i.e., a positive temperature coefficient) of increasing as the temperature increases (refer to a characteristic diagram W4, circled with the dotted lines in FIG. 7, of the voltage VN). As shown in the characteristic diagram W4 of the voltage VN, a voltage value of the voltage VN becomes AGND (25° C.) at room temperature (25 centigrade). The voltage VG has a voltage value of Va at room temperature (25 centigrade). Both of the voltages VG and VN have a characteristic that their voltage levels are proportional to the temperature, and characteristic lines showing the characteristics of the voltages have the same slope, for example. That is, the characteristic line of the voltage VN is considered to be obtained by translating the characteristic line of the voltage VG in upward by a voltage difference between the analog reference voltage AGND (25° C.) and the voltage Va at room temperature so that the voltage level with respect to room temperature (25 centigrade) becomes AGND (25° C.), for example (AGND (25 centigrade)≧Va).

In the differential amplifier AMP2, a voltage level of the non-inverting input terminal (the fourth node ND4) of the operational amplifier OP20 is expressed as AGND+VG. The voltage level of the inverting input terminal (the second node ND2) of the operational amplifier OP20 is V(BGR1). The voltage difference thereof is multiplied (inverted and amplified) by (R50/R30). Thus, the characteristic line of the voltage VN as shown in the characteristic diagram W4 is obtained. That is, the voltage becomes AGND (25° C.) at room temperature (25 centigrade), and the voltage VN (the fourth voltage) having a characteristic (i.e., a positive temperature coefficient) of increasing its voltage level as the temperature increases is obtained.

Hereinafter, the operation of the differential amplifier AMP2 will be more specifically described with the reference to FIG. 11. FIG. 11 is a diagram for explaining a transfer function of the differential amplifier of FIG. 7. In FIG. 11, for convenience of description, four resistances, R1 to R4, are used. The resistance R1 corresponds to the first resistance R30 in FIG. 7. The resistance R2 corresponds to the second resistance R40 in FIG. 7. The resistance R3 corresponds to the third resistance R50 in FIG. 7. The resistance R4 corresponds to the fourth resistance R60 in FIG. 7. An input voltage V1 is applied to the inverting input terminal of the operational amplifier OP20, and an input voltage V2 is applied to the non-inverting input terminal of the same. An output of the operational amplifier OP20 denotes Vout. A potential of the common connection point of the resistances R1 and R3 is denoted as Vx, and that of the resistances R3 and R4 is denoted as Vs. A reference voltage is denoted as Vref. The reference voltage Vref is the reference voltage AGND, for example. Further, current flowing into the common connection point of the resistances R1 and R3 is denoted as i1. In FIG. 11, Equations (42) and (43) blow are satisfied.

$$\frac{(V1 - Vx)}{R1} + \frac{(Vout - Vx)}{R3} = 0 \tag{42}$$

$$\frac{(V2 - Vs)}{R2} + \frac{(Vref - Vs)}{R4} = 0 \tag{43}$$

Vx=Vs is satisfied due to a virtual short. Thus, Equation (43) above can be expressed as Equation (44) below. In addition, when Equation (42) above is rearranged for Vx, Equation (45)

below is obtained. Similarly, when Equation (44) is rearranged for Vx, Equation (46) below is obtained.

$$\frac{(V2-Vx)}{R2} + \frac{(Vref-Vx)}{R4} = 0 \quad (44)$$

$$\frac{V1}{R1} + \frac{Vout}{R3} - \left(\frac{1}{R1} + \frac{1}{R3}\right)Vx = 0 \quad (45)$$

$$\frac{V2}{R2} + \frac{Vref}{R3} - \left(\frac{1}{R2} + \frac{1}{R4}\right)Vx = 0 \quad (46)$$

By solving Equation (46) for Vx, Equation (47) is obtained. Next, by substituting Equation (47) for Equation (45) above, Equation (48) is obtained. When Equation (48) is rearranged, Equation (49) is obtained.

$$Vx = \frac{R2R4}{R2+R4}\left(\frac{V2}{R2} + \frac{Vref}{R4}\right) \quad (47)$$

$$\frac{V1}{R1} + \frac{Vout}{R3} - \left(\frac{1}{R1} + \frac{1}{R3}\right)\frac{R2R4}{R2+R4}\left(\frac{V2}{R2} + \frac{Vref}{R4}\right) = 0 \quad (48)$$

$$\frac{V1}{R1} + \frac{Vout}{R3} - \frac{R1+R3}{R1R3}\frac{R2R4}{R2+R4}\left(\frac{V2}{R2} + \frac{Vref}{R4}\right) = 0 \quad (49)$$

A parameter x is defined as Equation (50). When Equation (49) above is rearranged by using the parameter x, Equation (51) below is obtained. By solving Equation (51) for Vout, Equation (52) is obtained. Then, Vout is expressed as Equation (53) when R1=R2 and R3=R4 are satisfied.

$$\frac{R1+R3}{R1R3}\frac{R2R4}{R2+R4} = x \quad (50)$$

$$\frac{V1}{R1} - x\frac{V2}{R2} + \frac{Vout}{R3} - x\frac{Vref}{R4} = 0 \quad (51)$$

$$Vout = -\frac{R3}{R1}V1 + x\frac{R3}{R2}V2 + x\frac{R3}{R4}Vref \quad (52)$$

$$Vout = -\frac{R3}{R1}(V1-V2) + Vref \quad (53)$$

As Equation (53) above shows, when R1=R2 and R3=R4 are satisfied, the voltage Vref (i.e., the voltage AGND (the analog reference voltage) which is an arbitrary voltage) is expressed as an independent term in the equation of Vout (Equation (52)). That is, when R1=R2 and R3=R4 are satisfied, the operational amplifier OP20 shown in FIG. 11 multiplies a voltage difference between the input voltages V1 and V2 by −(R3/R1), and adds the voltage Vref(=AGND) singly to the voltage obtained by multiplying by −(R3/R1). As a result, the output voltage Vout is obtained. That is, when R1=R2 and R3=R4 are satisfied, as is obvious from Equation (53), the voltage difference between two input voltages V1 and V2 of the operational amplifier OP20 is inverted and amplified. The gain is determined by a ratio of the first resistance R1 to the feedback resistance R3. One end of the first resistance R1 is coupled to the inverting input terminal of the operational amplifier OP20. The output voltage of the operational amplifier 20 changes to a positive polarity or a negative polarity with respect to an arbitrary reference voltage Vref (=AGND) by the voltage inverted and amplified. The differential amplifier AMP 20 shown in FIG. 11 is an inverting amplifier circuit that operates with respect to the reference voltage Vref(=AGND) as a reference level, and multiplies a difference of two input voltages (the voltages V1 and V2) by (R3/R1).

As is obvious from the above description, in a case of the differential amplifier AMP2 shown in FIG. 7, when R30=R40 and R50=R60 are satisfied, a voltage difference between the output voltage V(BGR1) of the first band gap circuit BGR1 and the output voltage VG of the inverting amplifier AMP1 is multiplied by −(R50/R30). Then, the voltage AGND is singly added to the voltage obtained by multiplying by −(R50/R30). As a result, the voltage VN is obtained. The differential amplifier AMP2 of FIG. 7 is the inverting amplifier circuit that operates with respect to the reference voltage Vref(=AGND) as a reference level, and multiplies the difference between two input voltages (the voltages V1 and V2) by (R50/30).

The output voltage VN of the differential amplifier AMP2 can be expressed in a form that the temperature compensation voltage VTS is added to the analog reference voltage AGND. The temperature compensation voltage VTS is obtained by inverting a potential polarity of a voltage difference between a "voltage which depends on the temperature" and a "voltage which does not depend on the temperature," and amplifying the resulting voltage difference by a predetermined gain. That is, the output voltage VN is expressed as VN=AGND+VTS. The voltage VN is considered as the temperature compensated analog reference voltage Vtemp. Accordingly, the non-inverting input terminal of the operational amplifier OP1 in the synchronous detection circuit 600 of FIG. 1 is biased by the voltage VN so that the synchronous detection circuit 600 is temperature compensated. That is, the fourth voltage VN having the positive temperature coefficient can be basically used as the temperature compensated analog reference voltage (Vtemp).

Structure and Operation of Variable Gain Amplifier AMP3

Referring back to FIG. 7, a further description will be made. The fourth voltage VN, described above, having the positive temperature coefficient can be basically used as the temperature compensated analog reference voltage (Vtemp). However, due to the circuit design, the temperature compensated voltage Vtemp may be required to have a desired temperature coefficient (to be sensitive with respect to the temperature) for some reason. If the temperature compensation circuit 220 shown in FIG. 7 can meet such a requirement, the circuit 220 can respond flexibly to various demands of various circuits.

Therefore, the temperature compensation circuit 220 shown in FIG. 7 is provided with a variable gain amplifier AMP3 and a voltage adder VOD so as to arbitrarily adjust a slope of the characteristic line of the voltage VN. Consequently, Vtemp (=AGND+VTS) having various temperature characteristics can be arbitrarily generated.

The variable gain amplifier AMP3 includes an operation amplifier OP30, a variable resistance (a fifth resistance) R70, a resistance (a sixth resistance) R90, and a variable resistance (a feedback resistance having a variable resistance value: a seventh resistance) R80. The variable resistance R70 is coupled between the seventh node ND7 and the eighth node ND8 (an inverting input terminal of the operation amplifier OP30). The resistance R90 is coupled between the ninth node (a non-inverting input terminal of the operation amplifier OP3) ND9 and the tenth node (an AGND node) ND10. The variable resistance R80 is coupled between an output node ND11 of the operation amplifier OP30 and the eighth node ND8.

A gain of the variable gain amplifier AMP3 can be arbitrarily adjusted by changing the resistance values of the variable resistances R70 and R80. The resistance values of the variable resistances R70 and R80 can be adjusted by a resistance value adjusting signal. Further, the variable gain amplifier AMP3 is an inverting amplifier. Furthermore, to the non-inverting input terminal of the operation amplifier OP30 included to the variable gain amplifier AMP3, the voltage AGND from the AGND generator circuit 226 is applied. Therefore, the variable gain amplifier AMP3 serves as an inverting amplifier circuit operating with the voltage AGND as a reference level and the gain is determined by R80/R70. The temperature characteristic of the output voltage VY of the variable gain amplifier AMP3 has a negative temperature coefficient. Specifically, the characteristic of the voltage level with respect to the temperature is expressed by a linear function with a negative slope (i.e., having a characteristic of a negative linear proportion with respect to the temperature). The slope of the characteristic line showing the temperature characteristic of the fifth voltage VY can be arbitrarily adjusted by changing the resistance values of the variable resistances R70 and R80 (refer to a characteristic diagram W5, circled by dotted lines in FIG. 7, of the voltage VY). The fifth voltage VY can be used as the temperature compensated voltage Vtemp.

Structure and Operation of Voltage Adder VOD

The voltage adder VOD includes a first voltage adding resistance R100 and a second voltage adding resistance R110. The first voltage adding resistance R100 is coupled between the eleventh node ND11 and the twelfth node ND12. The second voltage adding resistance R110 is coupled between the seventh node ND7 and the twelfth node ND12. The twelfth node ND12 is a common connection node of the first voltage adding resistance R100 and the second voltage adding resistance R110.

Resistance values of two resistances (the first voltage adding resistance R100 and the second voltage adding resistance R110) included in the voltage adder VOD are set to be the same, for example. In the voltage adder VOD, the voltage VY (a voltage having a positive temperature characteristic) is added to the voltage VN (a voltage having a negative temperature characteristic). As a result, the temperature compensated voltage Vtemp (=AGND+VTS) is generated.

Both of the fifth voltage VY and the fourth voltage VN are generated with respect to the voltage AGND as a reference level, and voltage values thereof become AGND (25° C.) at room temperature (25 degrees centigrade). When the ambient temperature is other than room temperature (25 degrees centigrade), the voltage level of the temperature compensated reference voltage Vtemp is determined by VY−VN. If a slope of a segment of the characteristic line of the fourth voltage VN shown in the characteristic diagram W4 and that of the fifth voltage VY shown in the characteristic diagram W5 are the same, the fifth voltage VY and the fourth voltage VN are cancelled out each other. Therefore, the voltage level of the voltage Vtemp is maintained at AGND (25° C.) in a wide temperature range. That is, if the resistance R70=the resistance R80 is satisfied in the variable gain amplifier AMP3, the variable gain amplifier AMP3 merely functions as an inverting amplifier having a gain of 1. In this case, the voltage Vtemp is maintained at AGND (25° C.) in a wide temperature range. Consequently, the temperature compensation of the voltage AGND can be realized (refer to a characteristic diagram W6, circled with dotted lines in FIG. 7, of the voltage Vtemp).

As is apparent from the characteristic diagram W6 of the voltage Vtemp, when the voltage level of the temperature compensated voltage Vtemp is maintained at AGND (25° C.) in a wide temperature range, a voltage difference between an actual AGND and AGND (25° C.) becomes the temperature compensation voltage VTS. That is, as shown in FIG. 1, the temperature compensated voltage Vtemp is obtained by adding the temperature compensation voltage VTS to an actual analog reference voltage AGND (Vtemp=AGND+VTS). If the actual voltage of AGND has a negative polarity with respect to the AGND (25° C.), the temperature compensation voltage VTS has a positive polarity with respect to the actual voltage. If the actual voltage AGND has a positive polarity with respect to AGND (25° C.), the temperature compensation voltage VTS has a negative polarity with respect to the actual voltage of AGND.

That is, the actual AGND has a negative temperature coefficient, but the negative temperature coefficient is cancelled out by the temperature compensation voltage VTS having a positive temperature coefficient. Accordingly, the voltage Vtemp that is the voltage AGND after temperature compensation does not depend on the temperature to be constant (=AGND (25° C.)) in a wide temperature range.

Further, the voltage adder VOD adds the voltage VN and the voltage VY (a voltage obtained by inverting and amplifying the voltage VN), being able to cancel out a noise (especially, a white noise) superimposed on the voltage VN. Therefore, a noise of the temperature compensated voltage (Vtemp) can be further deduced.

Thus, the temperature compensation with respect to the analog reference voltage AGND (an analog ground) is realized.

Further, when a temperature characteristic of a circuit is compensated, the temperature compensated voltage Vtemp may be required to have a desired temperature coefficient (to be sensitive with respect to the temperature) for some reasons. The temperature compensation circuit 220 shown in FIG. 7 can meet such a requirement. That is, the voltage level of the temperature compensation voltage VTS is arbitrarily adjusted by controlling the temperature characteristic (i.e., a slope of the characteristic line) of the output voltage VY of the variable gain amplifier AMP3.

That is, the characteristic diagram W6 of the voltage Vtemp shows a plurality of characteristic lines indicated with dotted lines. Thus, the characteristic of the temperature compensated voltage Vtemp with respect to the temperature can be arbitrarily adjusted by adjusting the gain of the variable gain amplifier AMP3. Therefore, the temperature compensation circuit of the embodiment can flexibly respond to various demands of various circuits. That is, according to the embodiment, temperature compensation with high accuracy is realized, and further, a temperature compensation circuit having high flexibility is achieved.

Fifth Embodiment

In the embodiment, a gyro sensor including a physical quantity measuring device (IC) will be described. To the physical quantity measuring device (IC), a crystal resonator serving as a physical quantity transducer, for example, is coupled.

Gyro sensors include a rotary type gyro sensor, a vibration type sensor, and the like. These kinds are distinguished by a way of sensing force acting on a material. Among these gyro sensors, the vibration type gyro sensor is suitable for miniaturization and cost reduction from viewpoints of components and the like. The vibration type gyro sensor that senses an angular velocity acting on a material includes a piezoelectric vibration type gyro sensor which vibrates quartz crystal or a piezoelectric element, and is advantageous to reliability and miniaturization. The piezoelectric vibration type gyro sensor uses Coriolis force which is generated, when an angular velocity is applied on a vibrating material, in an orthogonal direction to the vibration.

For example, in the vibration type gyro sensor that senses an angular velocity, a driving vibration in a certain direction is generated in the physical transducer (a vibrator). When an angular velocity is applied to the vibrator, Coriolis force is generated in an orthogonal direction to the driving vibration. Consequently, a sensing vibration is generated. The sensing vibration generated in the orthogonal direction to the driving vibration, so that a sensing signal (a signal component based on the sensing vibration) has a phase shifted by 90 degrees with respect to a phase of a driving signal (a signal component based on the driving vibration). Accordingly, the sensing signal can be sensed in distinction from the driving signal by the synchronous detection described above. By a use of a crystal resonator as the vibrator, the vibration type gyro sensor can be miniaturized and its reliability can be improved. The vibration type gyro sensor has various uses, and is used for sensing, for example, a shake of a video camera or a digital camera, a position of a global positioning system (GPS) of a car navigation system, and a posture of an air plane or a robot.

Figure 8:
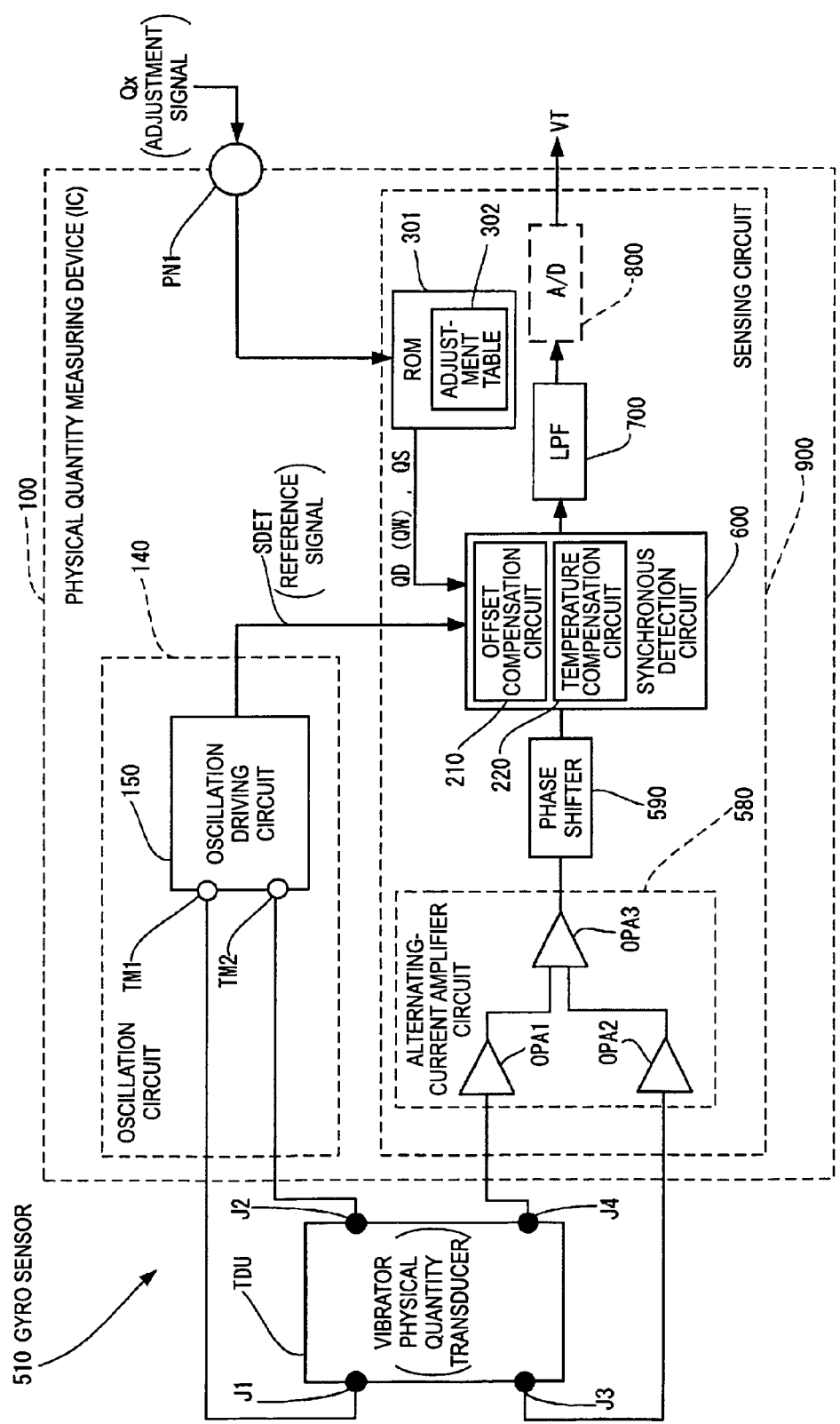
FIG. 8 is a diagram showing a structure of a gyro sensor.

FIG. 8 shows a structure of a gyro sensor. A gyro sensor 510 includes a physical quantity measuring device (IC) 100, and a physical quantity transducer (a vibrator) TDU. The physical quantity measuring device (IC) 100 includes an oscillating circuit 140 having an oscillation driving circuit 150, and a sensing circuit 900. To two connecting terminals TM1 and TM2 of the oscillation driving circuit 150, a terminal J1 and a terminal J2 of the physical quantity transducer (the vibrator) are respectively coupled. The oscillation driving circuit 150 outputs a synchronous detection reference signal SDET.

The sensing circuit 900 includes an alternating-current (AC) amplifier circuit 580, a phase shifter 590, a synchronous detection circuit 600, a low pass filer (LPF) 700, and a ROM 301 in which an adjustment table 302 is built. If necessary, an A/D converter circuit 800 is provided.

The AC amplifier circuit 580 includes current/voltage converting type amplifiers OPA1 and OPA2, and a differential amplifier OPA3. The current/voltage converting type amplifiers OPA1 and OPA2 amplify physical quantity signals (i.e., input signals Vin) respectively output from a terminal J3 and a terminal J4 of the physical quantity transducer (the vibrator) TDU. The phase shifter 590 adjusts a phase of a signal output from the AC amplifier circuit 580.

As described above, the synchronous detection circuit 600 includes the offset compensation circuit 210, and the temperature compensation circuit 220. The synchronous detection circuit 600 operates as the above description. A voltage level of the offset compensated signal Voffm output from the offset compensation circuit 210 is controlled by correction data QD from the ROM 301 (correction data for adjusting the resistance value of the R2R ladder circuit shown in FIG. 4), or a resistance adjustment signal QW (an adjustment signal for adjusting the resistance value of the feedback resistance R40 in the circuit shown in FIG. 6).

A voltage level of the temperature compensated signal VTS output from the temperature compensation circuit 220 is controlled by a resistance value adjustment signal QS output from the ROM 301 (an adjustment signal for adjusting the resistance value of the variable gain amplifier AMPS shown in FIG. 7).

Figure 9:
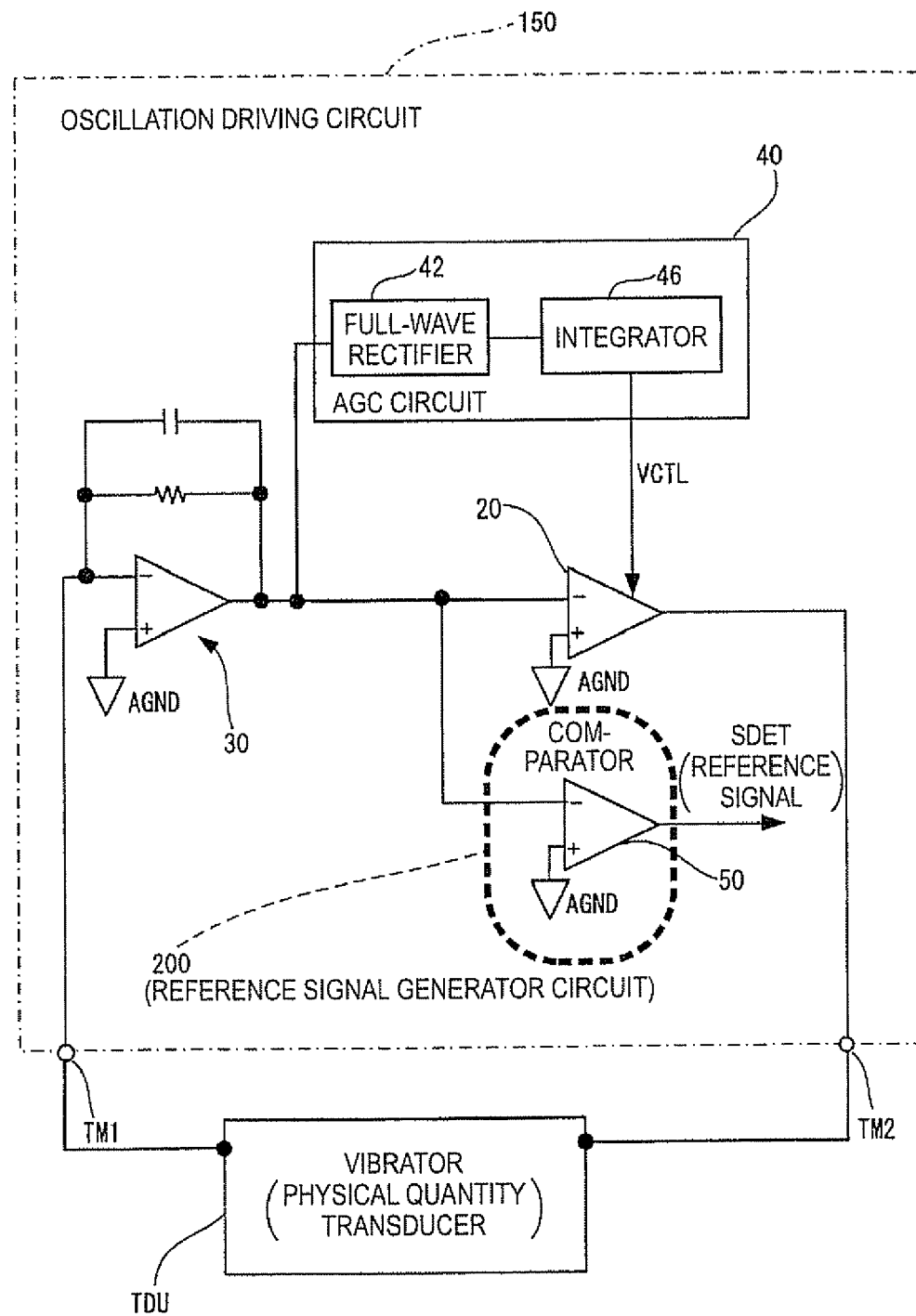
FIG. 9 is a diagram showing a structure of an oscillation driving circuit.

FIG. 9 shows a structure of the oscillation driving circuit shown in FIG. 8. To the connection terminals TM1 and TM2 of the oscillation driving circuit 150, the physical quantity transducer (the vibrator) TDU is coupled. The oscillation driving circuit 150 and the physical quantity transducer (the vibrator) TDU constitute an oscillation loop.

The oscillation driving circuit 150 includes a first stage amplifier 30, a variable gain amplifier 20, an AGC circuit 40, and a comparator 50 serving as a reference signal generating circuit 200. The comparator 50 generates a reference signal SDET for synchronous detection. The reference signal SDET is supplied to the synchronous detection circuit 600 (refer to FIGS. 1 and 2). The AGC circuit 40 includes a full-wave rectifier 42 and an integrator 46. A gain of the variable gain amplifier 20 is controlled by a gain control signal VCTL output from the integrator 46.

Sixth Embodiment

Figure 10:
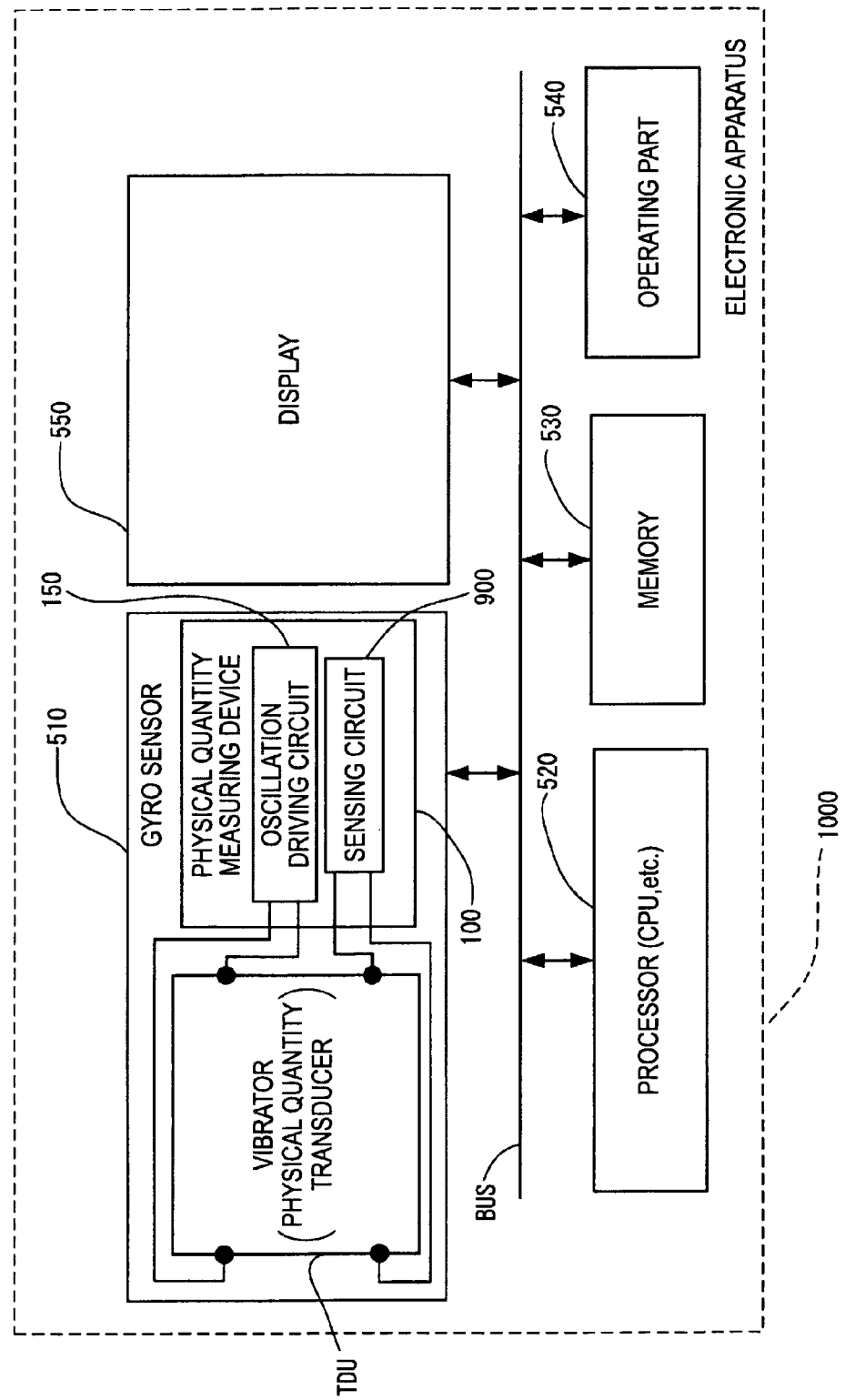
FIG. 10 is a diagram showing a structure of an electronic apparatus.

In the embodiment, an example of an electronic apparatus including the physical quantity measuring device of the invention will be described. FIG. 10 shows a structure of an electronic apparatus including the physical quantity measuring device of the invention.

An electronic apparatus (e.g., a digital camera) 1000 shown in FIG. 10 includes a gyro sensor (the physical quantity measuring device) 510, a display 550, a processor 520 such as a CPU, a memory 530, and an operating part 540. The gyro sensor 510 includes the physical quantity measuring device (IC) 100. The physical quantity measuring device 100 includes the oscillation driving circuit 150 and the sensing circuit 900. Further, to the physical quantity measuring device 100, the physical quantity transducer (the vibrator) TDU is coupled.

The sensing circuit 900 of the physical quantity measuring device 100 can cancel an offset voltage and a temperature offset with high accuracy as described above. Therefore, the gyro sensor 510 to which the physical quantity transducer (TDU) is coupled has high sensing performance. Similarly, the electronic apparatus 1000 which includes the gyro sensor 510 of the invention can sense the physical quantity with high accuracy. Thus, the performance of the electronic apparatus 1000 including the gyro sensor 510 of the invention is improved. The electronic apparatus 1000 is not limited to the digital camera, but may be a car navigation system, an air plane, or a robot.

According to the embodiments described above, the following advantageous effects can be obtained, for example. However, it should be noted that the following advantageous effects are not always obtained all at once, and they do not limit the technical scope of the invention.

1. Compensation of an offset voltage superposed on an output voltage of a synchronous detection circuit (a sensing circuit) and compensation of variation of a direct current reference voltage which depends on a temperature in a signal path are both realized, a noise of the compensation can be minimized, and sensing accuracy of the sensing circuit can be further improved.

2. In the synchronous detection circuit, offset compensation and temperature compensation can be performed collectively, so that an effective layout as a whole sensing circuit can be realized.

3. An offset cancel process can be realized at the synchronous detection circuit so that an offset cancel circuit (a zero-point adjustment circuit) is not necessary to be provided after the synchronous detection circuit. Providing a memory circuit (e.g., a nonvolatile memory such as an EPROM) that stores adjustment data for offset canceling in an IC which includes the synchronous detection circuit (the sensing circuit) can automate a canceling process of an offset voltage by using a look-up table method, for example.

4. A sensing circuit including the synchronous detection circuit having extremely high sensing sensitivity is realized.

5. A physical quantity measuring device that is capable of measuring physical quantity with substantially high accuracy based on a minute physical quantity signal is realized.

6. A gyro sensor that is capable of sensing physical quantity with high accuracy (high sensitivity) based on a signal output from a vibrator is realized.

7. Based on a measuring result by the physical quantity measuring device, an operation of an electronic apparatus can be controlled, or the measuring result can be displayed on a display screen of the electronic apparatus, for example. Since the physical quantity measurement with high accuracy is realized, a performance of the electronic apparatus is also improved.

8. The sensing circuit of the invention can be used as a detection circuit for a communication signal as well as the sensing circuit inputting a signal from a sensor. In this case, the synchronous detection circuit operates as a quadrature detection circuit (or a mixer circuit performing frequency conversion). A carrier wave can be used as a reference signal, for example.

It should be understood that the present invention is not limited to the above describe embodiments and various modifications can be made without departing from the novelty and advantageous effects of the invention. Accordingly, all of such changes are to be regarded to be in the scope of the invention. For example, though the synchronous detection circuit is described in the above description, the circuit may be called a mixer in a communication field. That is, the synchronous detection circuit can be considered as a mixer because the circuit has a function of converting alternating current into direct current (performs frequency conversion). The synchronous detection circuit can be realized with a circuit structure of a single balanced mixer or a double balanced mixer.

Although, in the above embodiments, the cases in which the synchronous detection circuit is used are described, the invention can also be applied for using other electronic detection circuits such as an envelope detection circuit or a delay detection circuit. That is, the invention can be widely used as a technique that performs offset compensation and temperature compensation of a detection circuit (a sensing circuit including the detection circuit).

The invention allows minimizing a noise, performing offset compensation and temperature compensation of a synchronous detection circuit (a sensing circuit including a synchronous detection circuit). The invention includes an effect of further improving an S/N ratio of the synchronous detection circuit, and is useful as a synchronous detection circuit (a sensing circuit including a synchronous detection circuit), a physical quantity measuring device, a gyro sensor, an electronic apparatus, and the like, for example.

What is claimed is:

1. A synchronous detection circuit, comprising:
an offset compensation circuit which generates an offset compensation voltage to compensate for an offset voltage superposed on a direct current voltage signal; and
a temperature compensation circuit which generates a temperature compensation voltage to compensate for a variation of a direct current reference voltage that depends on a temperature in a signal path of a sensing circuit,
the synchronous detection circuit synchronously detecting an alternating current signal;
the offset compensation voltage and the temperature compensation voltage being respectively superposed on the alternating current signal which is input into the synchronous detection circuit;
the synchronous detection circuit synchronously detecting the alternating current signal on which the offset compensation voltage and the temperature compensation voltage have been superposed; and
the synchronous detection circuit being configured to detect both the alternating current signal alone and the alternating current signal when the offset compensation voltage and the temperature compensation voltage have been superposed thereon.

2. The synchronous detection circuit of claim 1 further comprising an inverting amplifier, the offset compensation voltage being superposed on the direct current reference voltage of a first input node of the inverting amplifier that inverts a voltage level of the alternating current signal; the temperature compensation voltage being superposed on the direct current reference voltage of a second input node of the inverting amplifier; and the direct current reference voltage of the second input node of the inverting amplifier being electrically isolated from the direct current reference voltage of the first input node.

3. The synchronous detection circuit of claim 2, an impedance of the offset compensation circuit viewed from the first input node of the inverting amplifier being constant regardless of an operating state of the offset compensation circuit.

4. The synchronous detection circuit of claim 3, the offset compensation circuit being a D/A converter of an R2R ladder type, and an impedance of the R2R ladder viewed from the first input node of the inverting amplifier being constant.

5. The synchronous detection circuit of claim 3, the offset compensation circuit including an operational amplifier that outputs the offset compensation voltage, and an output impedance of the operational amplifier being constant so that an impedance of the offset compensation circuit viewed from the first input node of the inverting amplifier is constant.

6. A sensing circuit, comprising:
the synchronous detection circuit of claim 1; and
a smoothing circuit which smoothes an output signal of the synchronous detection circuit.

7. The sensing circuit of claim 6, further comprising a memory circuit that stores adjustment data for controlling an operation of the offset compensation circuit.

8. A physical quantity measuring device, comprising:
the sensing circuit of claim 6, a physical quantity signal to be measured being input into the sensing circuit.

9. The physical quantity measuring device of claim 8, further comprising a vibrator serving as a sensor and an oscillation driving circuit which forms an oscillation loop with the vibrator to excite a drive vibration for the vibrator, wherein the physical quantity signal is output from the vibrator, and the oscillation driving circuit generates a reference signal for synchronous detection in the sensing circuit based on a signal in the oscillation loop and provides the sensing circuit with the reference signal.

10. A gyro sensor, comprising:
the physical quantity measuring device of claim 9; and
the vibrator that outputs the physical quantity signal.

11. An electronic apparatus, comprising:
the physical quantity measuring device of claim 8.

12. An electronic apparatus, comprising:
the gyro sensor of claim 10.

13. A synchronous detection circuit, comprising:
a synchronous detection unit that receives a sinusoidal input signal and generates a rectified output signal, the synchronous detection unit comprising:

a non-inverting switched path that generates a non-inverted first portion of the rectified output signal; and an inverting switched path that generates an inverted second portion of the rectified output signal, the inverted second portion including a temperature compensation voltage and an offset compensation voltage;

an offset compensation circuit that generates the offset compensation voltage applied to the inverted second portion of the rectified output signal; and a temperature compensation circuit that generates the temperature compensation voltage applied to the inverted second portion of the rectified output signal.

14. The synchronous detection circuit of claim 13, the inverting switched path comprising:

an inverting amplifier, the offset compensation voltage being superimposed on a direct current reference voltage applied to a first input node of the inverting amplifier, and the temperature compensation voltage being superimposed on the direct current reference voltage applied to a second input node of the inverting amplifier.

15. The synchronous detection circuit of claim 13, the offset compensation voltage generated by the offset compensation circuit being electrically isolated from the temperature compensation voltage generated by the temperature compensation circuit.

* * * * *